United States Patent
Rodriguez et al.

(10) Patent No.: US 7,154,621 B2
(45) Date of Patent: Dec. 26, 2006

(54) INTERNET DELIVERY OF DIGITIZED PHOTOGRAPHS

(75) Inventors: John Rodriguez, Capitola, CA (US);
Brian Bodmer, Santa Cruz, CA (US);
Bryan Dube, Scotts Valley, CA (US);
Mark Tarantino, Santa Cruz, CA (US);
Jonah Kaj Fleming, Santa Cruz, CA (US); Shekhar Kirani, Capitola, CA (US)

(73) Assignee: Lightsurf Technologies, Inc., Santa Cruz, CA (US)

( * ) Notice: Subject to any disclaimer, the term of this patent is extended or adjusted under 35 U.S.C. 154(b) by 905 days.

(21) Appl. No.: 09/814,009

(22) Filed: Mar. 20, 2001

(65) Prior Publication Data

US 2002/0135794 A1    Sep. 26, 2002

(51) Int. Cl.
*G06K 15/00* (2006.01)
(52) U.S. Cl. ..................... 358/1.15; 358/1.2
(58) Field of Classification Search ............ 358/1.15, 358/1.9, 1.18, 1.2, 447, 448; 379/100.01, 379/100.08, 100.12, 88.17
See application file for complete search history.

(56) References Cited

U.S. PATENT DOCUMENTS

| | | | |
|---|---|---|---|
| 5,319,542 A | 6/1994 | King et al. | 705/27 |
| 5,715,314 A | 2/1998 | Payne et al. | 705/78 |
| 5,745,681 A | 4/1998 | Levine et al. | 709/200 |
| 5,819,285 A | 10/1998 | Damico et al. | 707/104.1 |
| 5,956,709 A | 9/1999 | Xue | 707/3 |
| 6,029,141 A | 2/2000 | Bezos et al. | 705/27 |
| 6,317,722 B1 | 11/2001 | Jacobi et al. | 705/14 |
| 6,321,231 B1 * | 11/2001 | Jebens et al. | 707/104.1 |
| 6,324,521 B1 * | 11/2001 | Shiota et al. | 705/27 |
| 6,332,146 B1 | 12/2001 | Jebens et al. | 707/104 |
| 6,388,732 B1 * | 5/2002 | Williams et al. | 355/40 |
| 6,628,307 B1 | 9/2003 | Fair | 345/763 |
| 6,629,079 B1 | 9/2003 | Spiegel et al. | 705/26 |
| 6,636,863 B1 | 10/2003 | Friesen | 707/102 |
| 6,701,302 B1 * | 3/2004 | Schaeffer et al. | 705/26 |
| 2002/0158874 A1 * | 10/2002 | Cao | 345/428 |

* cited by examiner

*Primary Examiner*—Jerome Grant, II
(74) *Attorney, Agent, or Firm*—Blakely, Sokoloff, Taylor & Zafman, LLP; Judith A. Szepesi

(57) ABSTRACT

An improved Internet delivery system for digitized photographs is described. The system embodies methodologies that speed the delivery of digitized images from photographic film scan centers to consumers across the Internet with high reliability. By delivering all the digital images to a more powerful centralized server infrastructure prior to the consumer's earliest opportunity to view them on-line, these images or pictures can be downloaded to a viewer of interest (e.g., user or family member) quickly enough to provide an appropriate Web response. Optimizations are also described that streamline the throughput with load balancing and provide virtually guaranteed uniform service with fail-over. In this manner, the system provides improved access, storage, and on-line availability of digital images.

54 Claims, 16 Drawing Sheets

INTERNET DELIVERY OF DIGITIZED PHOTOGRAPHS

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates to a system and methodology for improving the Internet delivery speed and reliability of digital photographs from scan centers, where these images were originally scanned from photographic prints, to the user's browsers during high-volume periods of e-commerce transactions.

2. Description of the Background Art

Although digital cameras have become commonplace in consumer markets, most people still use cameras that capture images on celluloid film. Typically, the consumers physically take their exposed film to nearby drop-off centers for developing and printing. These customers later pick-up their processed photographs from wherever they initially had taken them. What the consumer gets for his or her two-stop effort is a single copy of the negatives and a single copy of typically 4"-by-6" standard (positive) prints from those negatives.

Often this initial transaction is the finality of the commercial experience for processing a roll of film. However, people may want either additional or enhanced copies of their pictures. They may want individual photographs enlarged, or they may want a print (or enlargement) of a portion of a photograph ("cropping"), or they may even want a picture printed on a tee shirt or some medium other than the conventional photo-print paper. In many situations, the non-professional photographer may want to share, or provide, copies or enhanced copies with friends, relatives, or associates, including sending out e-mail announcements about the pictures. Friends, relatives, or associates will frequently initiate the request for copies of the pictures. Thus in many instances, the decision to order more photo processing occurs at a later point in time from the initial transaction.

As can be expected, there is a litany of scenarios for wanting to order and purchase versions of the original photographs following the typical purchase of an initial roll of standard 4-by-6 prints. These usually necessitate inconvenience for the non-professional photographer to the extent that they often do not result in the consumers bothering to purchase the desired extra copies. Simply put, the necessary activities of filing, viewing, protecting, distributing, enhancing, and ordering hinder further commercial transactions.

Consider, for instance, what someone has to do to reproduce special photographs. Many people accumulate many developed rolls of film over time, and tend to store them somewhere, such as in several shoeboxes kept in a closet or attic. To find a particular photograph for either reproducing, enlarging, enhancing, sharing, or putting onto a coffee cup or tee shirt, the person could spend considerable time looking among a hoard of pictures, finding the matching negative, physically taking the negative to a photo center, placing the order (cropping requests are usually not even doable at most photo drop-off locations), physically returning to pick-up the new prints, and, if the goal is to distribute the prints to others, packaging them up for postage, and physically mailing them, sometimes from a post office.

Digitizing (analog) photographs offers many of the benefits and conveniences of digitized documentation. A digital photo, at sufficiently high resolution, provides a reasonable facsimile of the fidelity of the original from film. A digital photograph can be created from a print by scanning the original film photograph. In response to customer demand, retail photo developers are increasingly offering this capability as a standard service.

Today, the job of more conveniently storing and retrieving photographs is accomplished by making digital copies of the pictures, and recording those copies onto media such as floppy disks or CD-ROMs. This approach is currently provided by a number of retail photo-developing operators, which spawn dozens of distributed scan centers that make digital copies of customers' photographs at the same time the film is being developed. This commercial model is modestly successful at best, because it requires the customers to physically go to the nearest scanning center. Whereas the numerous photo film drop-off locations are very ubiquitous and relatively convenient, the much smaller group of distributed scan centers are more distant from the average customer.

Of course digital content lends itself to being transmitted across the Internet. The next approach for facilitating print reordering has been for the scan centers to make the digital images available on the Internet, or "Web," which would conveniently enable easy (shared) viewing, enhancing, and ordering activities for both the original customers and their friends, relatives, or associates. However, the scan centers face the same dilemma regarding the Internet distribution of digital images as did the individual.

Consider the difficulty of sharing one's photos on-line. A person could distribute his or her own digital pictures to friends and family by email; but given the current bandwidth constraints—even when employing today's "broadband" communication (e.g., DSL or cable modem)—this approach is not practical for high-resolution photographic-quality digital images. Given the excessive transmission times required to transmit full-size digital photos, it is much more convenient to simply use the postal service.

This problem is particularly acute for high-volume commercial distribution over the Internet of full-size digital photographs. The main problem with the transmission and display of photographs over the Internet is that the photographs are very large. The standard full-size scanned photograph is approximately 1+megabytes in size, while the average home has a modem connection to the Internet that will transfer 28,000 to 56,000 bits per second, if the Internet traffic is not too busy. Even if a single photograph is displayed, the transfer takes several minutes, which is an unacceptable user experience. Typically, users wish to review a roll of photographs at a time, which consists of 12, 24, or 36 photographs.

As a partial solution to this problem, a method was implemented for commercializing reprints by displaying highly-compressed images or "digital facsimiles" across the Internet. Whereas the full-size digital images could serve the same function as the negatives from film, that is, for the scan centers to reprint the photographs, compressed images (representations needing less data) can be used for speedy Internet distribution for previewing purposes. For instance, a standard full-size digital image is stored in a format of 1536-by-1024 pixels. Upon compressing that digital image to a "photo display size" (460-by-306 pixels), such an image becomes a reasonably Internet-distributable picture with acceptable fidelity for display on a computer monitor.

Apart from the issue of image transfer, digital images must also somehow be identified with a particular individual. Both purchasing and processing transactions involve processing photographs that are referenced by a roll of film. Therefore, each full-size image from a roll can be further compressed to a "thumbnail" size—96-by-64 pixels—to represent each photograph when an entire roll is displayed. A group of 12, 24, or even 36 thumbnails can quickly be transmitted across the Internet representing the roll of pictures. These thumbnail-size images, although of very low fidelity, provide sufficient pictorial information for recognizing a particular photograph from among a group of them on a computer monitor.

With these three digital image resolutions, or sizes, the scan centers can distribute a roll of thumbnails fairly quickly across the Internet on-demand, distribute a single photo display size photograph less quickly across the Internet on-demand, and make commercial prints on order from the full-size format which is stored on disk at the scan center. In any event, the full-size representation is not shipped across the Internet during any e-commerce transaction.

However, in some cases the full-size representations must be involved during the real-time user experience on the Web. Whereas the photo display sizes are suitable for on-line viewing to re-order products utilizing the original full-frame of a photograph, they are insufficient for supporting on-line enhancements. For example, a user may want to reprint only a single person who is part of a group of people in a picture, and do so from the convenience of his or her personal computer. Current photo web sites allow a user to zoom-in on a selected area within the photo display size being displayed, where the user selects a sub-portion of the original to be magnified on his or her computer monitor. Here, the user first isolates the area around that sub-portion, cropping out the remainder of the composition of the picture, and then magnifies that subset of the picture to preview it to determine if this would make a satisfactory print. Unfortunately today, this process is rather limited if it is derived from the medium resolution of photo display size images.

In particular, whereas enlarging photographs printed from film results in graininess, enlarging digitized images is even more dissatisfying. The enlargements magnify the pixels themselves more than the photo image they intend, a result known as "pixelization." Pixelization renders very blocky images, with poor edge detail and poor shade continuity. If the user crops away two-thirds of the picture, and then magnifies the selected third, the pixelized lowered resolution image would be disappointing. This experience is similar to what happens when one views an impressionism painting from the normal distance versus when one walks up closer to it (which is the same manipulation as magnifying a photograph). At some point one no longer sees the "impression," but rather the artistic technique that creates that impression: a pattern-less mosaic of spots with no distinguishing line or borders.

To address this problem, the photo web server needs to map the same portion of the picture that the user is considering to the original full-size image, compress that portion to a photo display size format for the user's display, and transmit it back to the user in real-time. This technique gives the user a better idea of what the enlargement would look like when printed, because all printing is done from the original full-size digitized representations. FIG. 1 is a block diagram illustrating the cropping enhancement process.

As shown in FIG. 1, this process includes a user's browser displaying a photo display size picture 110, a portion of the entire image that the user crops to enlarge 120, a corresponding full-size photograph at the photo web server 130, a photo display size image enlarged from the cropped area mapped within the full-size original picture 140, and a photo display size of the cropped area displaying in the user's browser 150.

Viewing the full-framed photo display size photograph in his or her browser 110, the user interacts with web software to specify a portion of the picture to crop down to 120. The full-framed photo display size in the user's browser corresponds to the original full-size image at the scan center 130. The photo web server runs software that maps the user-specified cropped area within the original full-size image at the scan center 130. The photo web server transforms the cropped area from within the full-size image to a photo display size image frame 140. The photo web server finally ships the photo display size cropped area across the Internet to be displayed in the user's browser 150. The real-time enhancement experience for the Internet user occurs more slowly than simply rendering a photo display size image in the user's browser 150.

Each photo web server manipulates all of the three formats of the photographs it initially had scanned from the photographic prints: full-size, photo display size, and thumbnail. To implement the previously-described real-time on-line photo services, a relatively small "claim server" is deployed at each scan center. Users use the appropriate URL (universal resource locator) to go to the enterprise's web site, where they enter a claim number they received when they initially picked up their film prints and negatives. The claim number serves to identify the roll of digitized images that the user wants to view on the Internet, where the "roll" of digital images corresponds to the grouping of pictures that originated on a customer's roll of film. The scan centers, of which there are about 60 currently in the United States, are completely distributed with no central source of control or connectivity: they each have their own corresponding "claim service" provided by their local claim server.

The current distribution infrastructure employs insufficient bandwidth. Each scan center has a relatively small bandwidth to the Internet, generally between 128K (ISDN) and a T1 line (that is shared rather than dedicated). FIG. 2 is a block diagram illustrating the bottlenecked infrastructure on which the scan centers rely to transfer digital pictures to web users on-demand. As shown in FIG. 2, the current claim service system includes a claim server 200 for each scan center, a moderately-low bandwidth connection to the Internet 202, a photo web site to manage e-commerce 204, and a web browser 206 which displays the images for the user.

The basic on-line operation proceeds as follows: Using his or her browser 206, the user requests his or her roll of images from the web site server 204, which forwards that request to the appropriate remote claim server 200 at the scan center where his or her roll of images is stored. The claim server 200 then requests its local transform server to compress the (claimed) roll of full-size images to corresponding thumbnails, and the claim server 200 returns these to the remote web site server 204. The remote web site server 204, in turn, passes them on to the user's browser 206. Whenever the user selects one of the thumbnails for fuller viewing, his or her request passes to the web site server 204, and on to the same claim server 200. The claim server 200, in turn, transforms the full-size image, this time to a photo display size, and returns that photo display size to the web site server 204, which parlays the photo display size to the user's browser 206.

This entire process occurs on-demand in real-time. Although the use of image compression enables photo e-commerce, five major deficiencies remain in the infrastructure of the scan centers preventing a good user experience. The scan centers usually have insufficient bandwidth to the Internet. The (small) claim server at a scan center is unable to handle (cyclical) spikes in demand. The scan centers cannot justify the cost for satisfactory services that would primarily be utilized for a few hours a day (with a high load). The scan centers do not provide high availability or reliability among the large number (60) of claim servers that do not have a system for fail-over. The scan centers have inadequate storage capability to maintain images for a sufficient period of time.

The average volume of traffic for each scan center does not justify high enough bandwidth for fluctuations in demand. Spikes in demand on the claim server are frequent because most users would access at common times, e.g., after work from 5 pm to 10 pm. FIG. 3 is a graph illustrating this phenomenon. The corresponding surge in bandwidth requirement for such periodic surges results in real-time high-volume traffic.

Seasonal spikes also exist, for example, during the Christmas holidays. When overloaded with requests, the connections between the claim servers and the web site servers are often dropped, or this might cause a claim server to crash. Whenever this happens, the requests fail and no photos can be retrieved. In any event, there is still a long delay on the first on-demand roll claim attempt, which diminishes the user experience even when photographs are successfully retrieved on the first try.

The current distribution infrastructure also utilizes existing resources poorly. Most of the day when demand is moderate to low, the claim server sits idle. Further, the claim server is often inaccessible for various reasons at random periods of the day. Attempts to add servers to each scan center have failed to provide sufficient service during periods of peak demand. Worse yet, with a distributed network of 60 independent services, there are 60 points of failure. Whenever one claim server goes down, none of the requests by any users for that node are satisfied. The service from that site must wait until that server is brought back up.

In order to provide a better level of service, various queue-based recovery schemes have been employed that try to retrieve the photographs when there are failures. One of the problems with these attempts to solve the problem is the ad hoc nature of the recovery solutions. There is no central point of recovery, and there is no fail-over. This stems, in part, from the hardware employed at the various scan centers. For instance, scan centers often employ relatively small disk storage systems, due to cost and to variance in the amounts of photographs each is required to store. Therefore, they can only handle storage for a relatively short period before they run out of disk space. Customers need a system that can process re-ordering for extended periods of time.

All told, the overall existing solution, having claim servers from which to retrieve photographs, is not scalable. No matter how many claim servers or storage disks are added, they simply cannot guarantee a high quality of service in a cost-effective manner. It is not efficient to purchase huge servers for each scan center to be able to service the periodic surge of user requests for only the short period of time (five hours), and then to remain relatively idle during the rest of the 24-hour day, nor is it cost effective to purchase and retain huge under-utilized disks for commercially adequate storage time. As a result of all of these shortcomings, a better solution is needed.

SUMMARY OF THE INVENTION

An improved Internet delivery system for digitized photographs is described. The system, which includes a centralized middle tier and supporting network topology, provides reliable and expeditious response to consumer photo e-commerce activity on the Internet that is consistent regardless of varying levels of demand is described. In operation, the system serves to shuttle digital images from disparate low-volume facilities, which scan photographic prints to generate their digitized counterparts, to a robust central service infrastructure that can accommodate high volume and sporadic consumer demand on the Internet. This transfer of digitized pictures to the central service needs to precede the real-time user requests for them via photo web sites on the Internet. In particular, the system exploits the requisite processing time to amass digitized versions that are created at the central service from users' developed rolls of the film; this time the window may range from a few hours to a few days.

The preferred embodiment is a system in which both a photo display size and a full-size digital image of the original photographs are made locally available to a central server(s) to satisfy the two common user activities during photo e-commerce: viewing and enhancing their pictures on-demand. Because the amount of data for full-size images exceeds that for the corresponding photo display size images by an order of magnitude, the full-size pictures are shipped using a higher (and more expensive) bandwidth than that used to transfer the photo display size pictures. Whereas the batch of photo display size images can be transferred to the central service facility via HTTP, using the (limited) available bandwidths connecting the scan centers to the Internet, in the window of a couple days, the currently-preferred implementation ships the batch of full-size images off-line on DLT tape, shipped via overnight service, for the majority of transfers. The preferred embodiment can use HTTP on the Internet to distribute the full-size images to the central service when higher Internet bandwidth (or other high-speed data network) becomes economically feasible.

The myriad of methods and their synchronization needed to interoperate the central service with the distributed scanning centers and with the photo web sites in a reliable manner requires multi-threaded operating systems coordinating against a common queue. The state of the queue, as well as the state of all the affairs of the multi-tier service are maintained in, and determined by, a common database. By implementing the queue through a database, rather than as in-line code, the preferred embodiment is implementing a fail-over mechanism that ensures a guaranteed service for all of the tasks involved in the system, regardless of failures of Internet routers, the mini servers managing the scan centers, or the relatively unreliable vicissitudes of HTTP communications. The tasks in the system delegate their finer-grained activities to a sequence of sub-tasks, each of which executes depending upon the database state (success/fail) of the execution of its antecedent sub-task. Should a sub-task fail, the system re-en-queues the entire inter-dependent team of sub-tasks, and runs them again from the beginning.

The database also maintains the state of the relative runtime loads among the servers in the system. A high-priority thread uses that state information to implement a balanced load among the servers in the system. Each scan center's mini server has a count in the database for the maximum number of tasks/connections it has demonstrated it can handle. If an implementation is busy enough to have deployed multiple central servers, a locking semaphore is used to prevent more than one central server from attempting to run the same task for a particular scan center.

After all the digital images have been uploaded to the central service, the central service maintains and distributes the images via high bandwidth to the photo web site servers on-demand to user requests. The centralized facility engenders a quantity of scale that permits a massive image storage system that cost-effectively extends the expiration period for images from what was limited to one week to up to four months or even longer. The date of expiration in storage for each roll of images is maintained in the database, and a periodic Java servlet deletes that roll when its expiration time passes.

GLOSSARY

Figure 1:
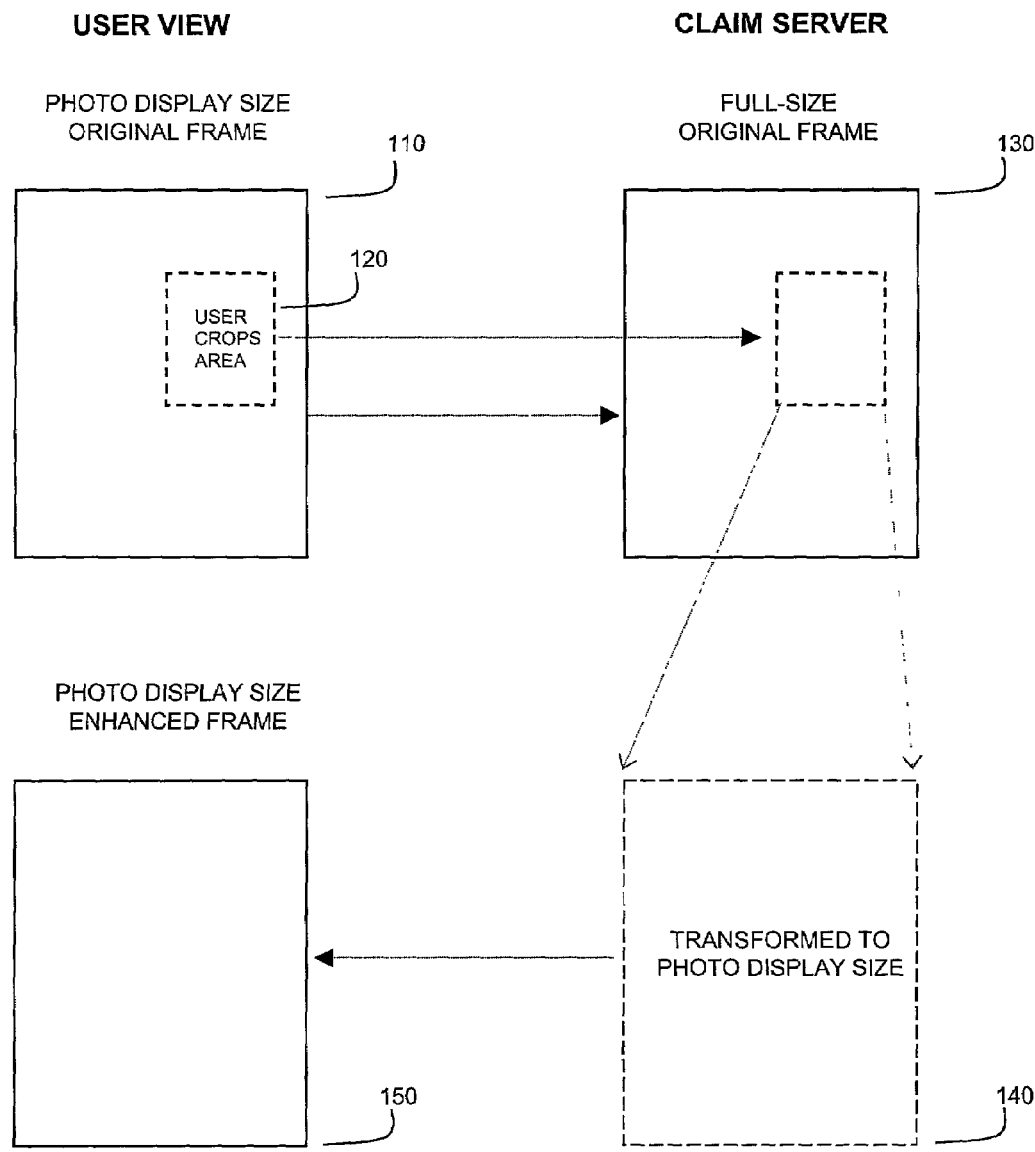
FIG. 1 is a block diagram illustrating the processing which enlarges a user-cropped region of a photograph to a photo display size of that region.

Cropping: Cropping delineates a sub-region of a photograph's composition for purposes of enlarging and printing only that portion.

De-queue: De-queuing initiates the execution of the task with the highest priority at the head of the queue. De-queuing, in the context of this disclosure, does not remove the element (task) from the queue.

DLT tape: DLT is an acronym for "Digital Linear Tape," a type of magnetic tape storage device originally developed by DEC (the Digital Equipment Corporation), and now marketed by several companies. DLTs are a ½-inch wide and the cartridges come in several sizes ranging from 20 to over 40 gigabytes. DLT drives are faster than most other types of tape drives, achieving transfer rates of 2.5 megabytes per second.

En-queue: En-queuing appends a task to the tail of the queue.

Full-size (digital) pictures: The scan centers convert the photographs from film to digital representations at a maximum resolution of typically 1536-by-1024 pixels. Full-size digital images are maintained in a Joint Photographic Experts Group (JPEG) format. The digital images have an aspect ration of 3:2. Later, these full-size images may be transformed down to lower resolutions for purposes of speedy delivery across the Internet. Currently, the Internet-shared individual images have a resolution of 460-by-306, whereas the Internet-shared display of a roll of pictures is represented by a group of images having a 96-by-64 resolution.

HTTP: HTTP is the acronym for "Hyper Text Transfer Protocol," which is the underlying communication protocol used by the World Wide Web on the Internet. HTTP defines how messages are formatted and transmitted, and what actions web site servers and browsers should take in response to various commands. For example, when a user enters a URL in his or her browser, this actually sends an HTTP command to the web site server directing it to fetch and transmit the requested Web page. Further description of HTTP is available in RFC 2616: Hypertext Transfer Protocol—HTTP/1.1, the disclosure of which is hereby incorporated by reference. RFC 2616 is available from the World Wide Web Consortium (W3C), and is currently available via the Internet at the following URL: http://www.w3.org/Protocols/.

JVM: JVM is an acronym for "Java Virtual Machine." An abstract computing machine, or virtual machine, JVM is a platform-independent programming language that converts Java bytecode into machine language and executes it. Most programming languages compile source code directly into machine code that is designed to run on a specific microprocessor architecture or operating system, such as Windows or UNIX. A JVM—a machine within a machine—mimics a real Java processor, enabling Java bytecode to be executed as actions or operating system calls on any processor regardless of the operating system. For example, establishing a socket connection from a workstation to a remote machine involves an operating system call. Since different operating systems handle sockets in different ways, the JVM translates the programming code so that the two machines that may be on different platforms are able to connect.

LAN: LAN is an acronym for a Local Area Network of electronic devices that communicate with each other via the network configuration. A LAN is typically a computer network that spans a relatively small area: most LANs are confined to a single building or group of nearby buildings. Each node (individual computer) in a LAN has its own CPU with which it executes programs, but it is also able to access data and devices anywhere on the LAN.

Photo display size digital image: Photo web sites use a medium resolution format best suited for distributing individual photographs across the Internet on-demand, typically using a resolution frame of around 460-by-306 pixels. The photo display size resolution is optimal for addressing two competing concerns: providing sufficient resolution for the user to review his or her photograph or to manipulate a portion of the photograph (enhancement) for the purpose of ordering additional photo printing during an on-line e-commerce experience, versus minimizing the data necessary to represent a photograph to minimize the latency when transporting a digital photograph across the Internet in real-time. Photo display size digital images are maintained in a Joint Photographic Experts Group (JPEG) format.

On-demand: "On-demand" is a type of HTTP response to an HTTP request such as a user's clicking on a button or hyper-linked image in a browser expecting a relatively immediate action to occur. This response is an immediate action taken by the HTTP server servicing the user's requests in real-time.

RAID: RAID is an acronym for "Redundant Array of Inexpensive Disks," which is a large capacity disk storage system involving multiple smaller hard disk drives, working in tandem to mimic one large disk. This arrangement provides fault tolerance and enables faster read/write operations. RAID products are available from several vendors, including Adaptec, Inc. of Milpitas, Calif.

Scan center: A scan center is a business facility that digitizes photographs from film, has its own LAN serviced by a mini server, and enables the Internet transfer of the digitized photographs to customers who may wish to enhance these digital photographs and/or order products that utilize them.

Task: A task is generically referred to as a job that employs a group of finer-grained operations. However, in the context of this invention, a task, and its orchestrated sub-tasks, all of which are run by the central server(s), are sequenced and determined by state that is maintained in the central server's database. This scheme of state-determined execution is the underlying mechanism for guaranteeing the services provided by the preferred embodiment. Task processing is not merely in-line code. Processing on the mini server, in the context of this invention, shall be referred to as operations.

Thumbnail: Thumbnails are used to display an entire roll of images. A thumbnail of an image is the conventional lesser-resolution format (96-by-64 pixels) for distributing a roll of photographs across the Internet on-demand. The thumbnail's level of resolution is optimal for addressing two competing concerns: providing sufficient resolution for recognizing a particular photograph from among a group of minimized images, versus minimizing the data necessary to represent a roll of photographs that can be quickly distributed across the Internet in real-time.

Transform server: Transform service compresses one JPEG image into a smaller JPEG image, thereby reducing the resolution and fidelity of the image to enable speedier portability and rendering. Transform servers execute specific algorithms to compress full-size digital images (e.g., 1536-by-1024 pixels) down to rapidly network downloadable photo display size images (e.g., 460-by-306 pixels), and they can further compress photo display size images down to a thumbnail size (e.g., 96-by-64 pixels) to display an entire list of still-recognizable photographic facsimiles.

URL: URL is an acronym for "Uniform Resource Locator," the global Internet address of documents and other resources on the World Wide Web; e.g., "http://www-.medicaldictionary.com."

XML: Extensible Markup Language (XML) is a specification developed by the W3C. XML is a pared-down version of SGML, designed especially for Web documents. It allows designers to create their own customized tags, enabling the definition, transmission, validation, and interpretation of data between applications and between organizations. For further description of XML, see, e.g., Extensible Markup Language (XML) 1.0 specification which is available from the World Wide Web Consortium (URL is w3.org), the disclosure of which is hereby incorporated by reference. The specification is also currently available on the Internet at the URL, http://www.w3.org/TR/REC-xml.

DETAILED DESCRIPTION OF A PREFERRED EMBODIMENT

The following description focuses on an embodiment of the present invention in an Internet-connected server environment, which is the currently-preferred embodiment. Additionally, DLT tape storage devices are employed for massive data transfer. However, those skilled in the art will appreciate that the present invention may be embodied in other devices capable of storing, organizing, and/or otherwise processing digital images. Further, the description will focus on implementation of portions of the invention in an Internet-connected environment including desktop and server computers, such as an IBM-compatible computer running under Microsoft® Windows 2000. The present invention, however, is not limited to any particular one application or any particular environment. Instead, those skilled in the art will find that the system and methods of the present invention may be advantageously embodied on a variety of different platforms, including Macintosh, Linux, BeOS, Solaris, UNIX, and the like. Therefore, the description of the exemplary embodiments which follows is for purposes of illustration and not limitation.

Basic Supporting Hardware and Software

A. Basic Computer Hardware (e.g., for Desktop and Server Computers)

Figure 4:
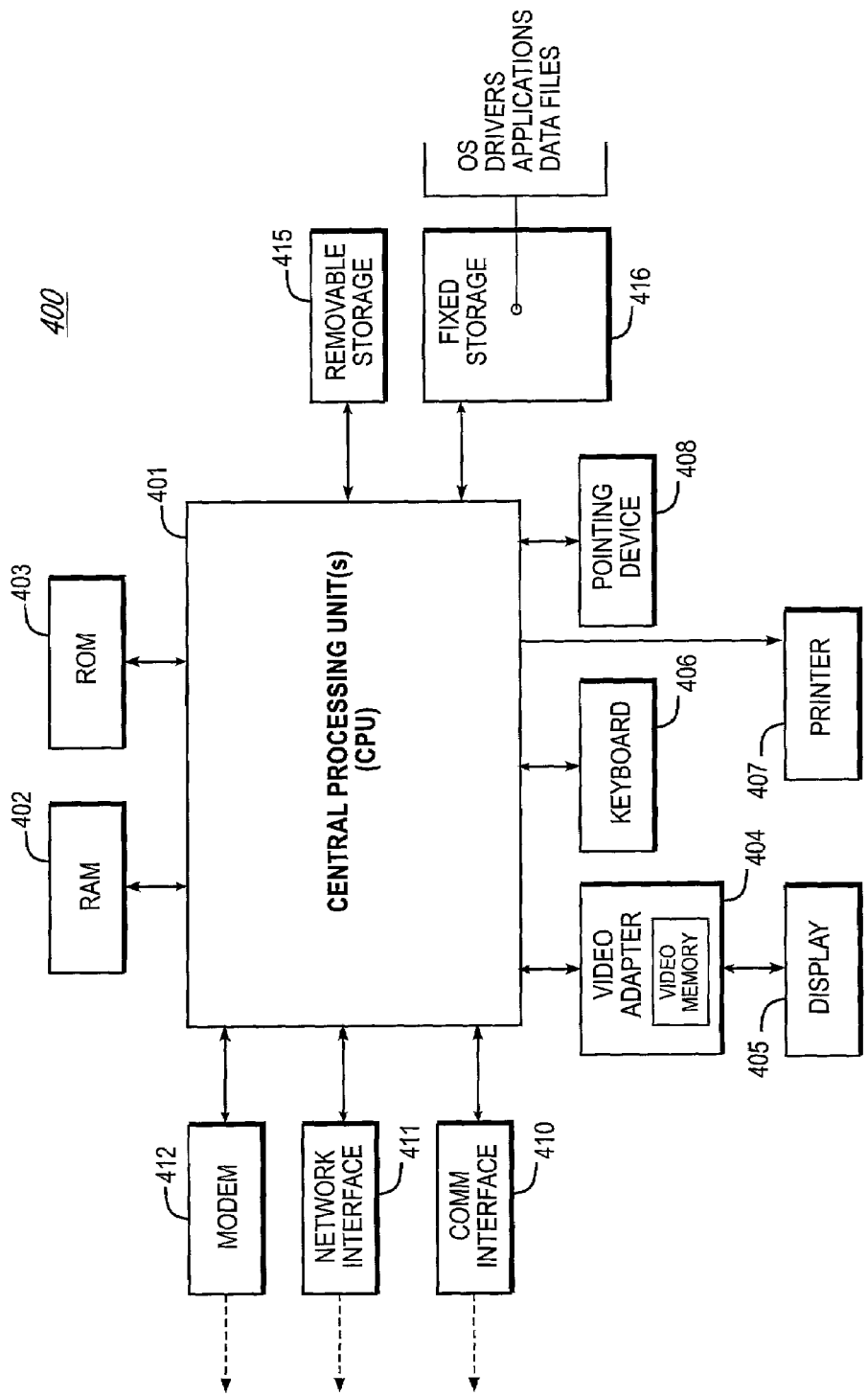
FIG. 4 is a general block diagram of a general-purpose computer system suitable for implementing the present invention.

Portions of the present invention may be implemented on a conventional or general-purpose computer system, such as an IBM-compatible personal computer (PC) or server computer. FIG. 4 is a very general block diagram of an IBM-compatible system 400. As shown, system 400 comprises a central processing unit(s) (CPU) 101 coupled to a random-access memory (RAM) 402, a read-only memory (ROM) 403, a keyboard 406, a pointing device 408, a display or video adapter 404 connected to a display device 405, a removable (mass) storage device 415 (e.g., floppy disk), a fixed (mass) storage device 416 (e.g., hard disk), a communication port(s) or interface(s) 410, a modem 412, and a network interface card (NIC) or controller 411 (e.g., Ethernet). Although not shown separately, a real-time system clock is included with the system 400, in a conventional manner.

CPU 401 comprises a processor of the Intel Pentium® family of microprocessors. However, any other suitable microprocessor or microcomputer may be utilized for implementing the present invention. The CPU 401 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 402 serves as the working memory for the CPU 401. In a typical configuration, RAM of sixteen megabytes or more is employed. More or less memory may be used without departing from the scope of the present invention. The read-only memory (ROM) 403 contains the basic input/output system code (BIOS)—a set of low-level routines in the ROM that application programs and the operating systems can use to interact with the hardware, including reading characters from the keyboard, outputting characters to printers, and so forth.

Mass storage devices 415, 416 provide persistent storage on fixed and removable media, such as magnetic, optical or magnetic-optical storage systems, flash memory, or any other available mass storage technology. The mass storage may be shared on a network or it may be a dedicated mass storage. As shown in FIG. 4, fixed storage 416 stores a body of program and data for directing operation of the computer system, including an operating system, user application programs, driver and other support files, as well as other data files of all sorts. Typically, the fixed storage 416 serves as the main hard disk for the system.

In basic operation, program logic (including that which implements methodology of the present invention described below) is loaded from the storage device or mass storage 416 into the main (RAM) memory 402, for execution by the CPU 401. During operation of the program logic, the system 400 accepts user input from a keyboard 406 and pointing device 408, as well as speech-based input from a voice recognition system (not shown). The keyboard 406 permits selection of application programs, entry of keyboard-based input or data, and selection and manipulation of individual data objects displayed on the display device 405. Likewise, the pointing device 408, such as a mouse, track ball, pen device, or the like, permits selection and manipulation of objects on the display device 405. In this manner, these input devices support manual user input for any process running on the system.

The computer system 400 displays text and/or graphic images and other data on the display device 405. Display device 405 is driven by the video adapter 404, which is interposed between the display device 405 and the system 400. The video adapter 404, which includes video memory accessible to the CPU 401, provides circuitry that converts pixel data stored in the video memory to a raster signal suitable for use by a cathode ray tube (CRT) raster or liquid crystal display (LCD) monitor. A hard copy of the displayed information, or other information within the system 400, may be obtained from the printer 407, or other output device. Printer 407 may include, for instance, an HP Laserjet® printer (available from Hewlett-Packard of Palo Alto, Calif.), for creating hard copy images of output of the system.

The system itself communicates with other devices (e.g., other computers) via the network interface card (NIC) 411 connected to a network (e.g., Ethernet network), and/or modem 412 (e.g., 56K baud, ISDN, DSL, or cable modem), examples of which are available from 3Com of Santa Clara, Calif. The system 400 may also communicate with local occasionally-connected devices (e.g., serial cable-linked devices) via the communication ("comm") interface 410, which may include a RS-232 serial port, a Universal Serial Bus (USB) interface, or the like. Devices that will be commonly-connected locally to the interface 410 include laptop computers, handheld organizers, digital cameras, and the like.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

The above-described system 400 is presented for purposes of illustrating the basic hardware underlying desktop (client) and server computer components that may be employed in the system of the present invention. For purposes of discussion, the following description will present examples in which it will be assumed that there exists a client machine (e.g., desktop "PC") having application software locally that, in turn, is connected to a "server" or remote device having information and/or services of interest to the ultimate end-user. The present invention, however, is not limited to any particular environment or device configuration. In particular, a client/server distinction is neither necessary to the invention nor even necessarily desirable, but is used to provide a framework for discussion. Instead, the present invention may be implemented in any type of computer system or processing environment capable of supporting the methodologies of the present invention presented in detail below.

B. Basic System Software

Figure 5:
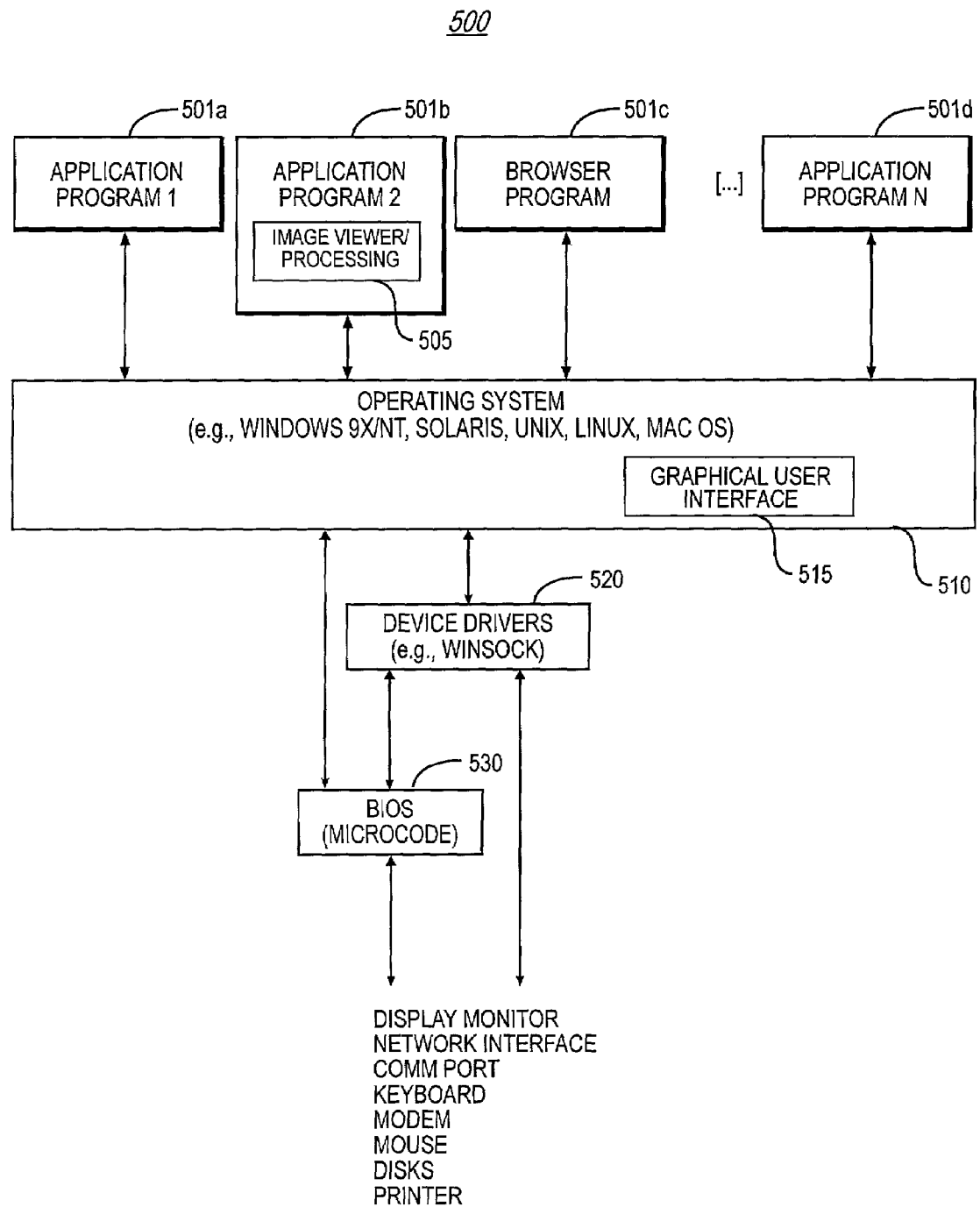
FIG. 5 is a block diagram of a computer software system suitable for controlling the computer of FIG. 4.

Illustrated in FIG. 5, a computer software system 500 is provided for directing the operation of the computer system 400. Software system 500, which is stored in system memory (RAM) 402 and on fixed storage (e.g., hard disk) 416, includes a kernel or operating system (OS) 510. The OS 510 manages low-level aspects of computer operation, including managing execution of processes, memory allocation, file input and output (I/O), and device I/O. One or more application programs, such as client application software or "programs" 501 (e.g., 501a, 501b, 501c, 501d) may be "loaded" (i.e., transferred from fixed storage 416 into memory 402) for execution by the system 400. For example, when the computer system 400 is used for a desktop client device, application software 501b may include a software 505 capable of viewing or otherwise processing digital image files, such as a Web (HTML) browser.

Software system 500 includes a graphical user interface (GUI) 515, for receiving user commands and data in a graphical (e.g., "point-and-click") fashion. These inputs, in turn, may be acted upon by the system 400 in accordance with instructions from operating system 510, and/or client application module(s) 501. The GUI 515 also serves to display the results of operation from the OS 510 and application(s) 501, whereupon the user may supply additional inputs or terminate the session. Typically, the OS 510 operates in conjunction with device drivers 520 (e.g., "Winsock" driver—Windows' implementation of a TCP/IP stack) and the system BIOS microcode 530 (i.e., ROM-based microcode), particularly when interfacing with peripheral devices. OS 510 can be provided by a conventional operating system, such as Microsoft® Windows 9x, Microsoft® Windows NT, or Microsoft® Windows 2000, all available from Microsoft Corporation of Redmond, Wash. Alternatively, OS 510 can also be an alternative operating system, such as the previously-mentioned operating systems.

The above-described system 400 is presented for purposes of illustrating the basic hardware underlying desktop and server computer components that may be employed in the system of the present invention. For purposes of discussion, the following description will present examples in which it will be assumed that there exists a "server" or similar device connected to clients, which maintains photographic information of interest to the ultimate end user. The present invention, however, is not limited to any particular environment or device configuration. In particular, a server distinction is not necessary to the invention, but is used to provide a framework for discussion. Instead, the present invention may be implemented in any type of computer system or processing environment capable of supporting the methodologies of the present invention presented in detail below.

Improved Internet Delivery of Digitized Photographs

A. Overview

The present invention comprises an improved Internet delivery system for digitized photographs, including supporting methodologies. The system provides improvement in performance and reliability over the currently-existing system for delivering digitized photographs over the Internet on-demand. The present invention may be embodied by modifying the current system to incorporate the components and methodologies described below.

In the preferred embodiment, the previously-mentioned scan centers continue to digitize images from the photographic prints and aggregate the images' metadata necessary for e-commerce, but the responsibility for servicing on-demand claims is processed by a more powerful centralized facility which can expedite the delivery of digitized photographs to the photo web sites over the Internet in real-time. The on-demand claim service that was previously distributed across the existing claim servers is delegated to a much more powerful multi-threaded "central server" in the preferred embodiment. A central server can execute a multitude of concurrent processes, for instance, 50–100 concurrent processes. A "mini server" communicates with the scan center and the central server. It performs file handling and bookkeeping, as well as handling Internet communication with the central server. A mini server is a moderately-powered multi-tasking multi-threaded server, located at a scan center, which can also concurrently execute multiple processes (although typically one would employ a less-expensive server computer than is used for the central server).

Unlike each individual scan center, the central service infrastructure has more processing capabilities, more image storage capacity, and very high bandwidth connecting to the Internet. The preferred embodiment is cost-effectively scalable to variations in demand and/or load across the servers at the scan centers. If demand is great enough, an implementation could deploy a cluster of cooperating central servers at the central service facility. The system is scalable to any amount of media transfers simply by addition of central servers or disk storage. This system also extends the time period that the customers' digitized pictures are available for future commerce because of centralized disk storage.

In the preferred embodiment the photo display size images (because these are the format most in demand for on-demand display) are locally available and ready for Internet delivery at the central facility prior to any user claims on-demand. Full size photos are available in the majority of cases prior to the user claiming them. Insofar as the photo web sites are the first hub to service user requests, the central server(s), rather than a small claim server in the previous system, has the digitized images locally available to be able to quickly transmit them over the Internet to those photo web sites on-demand. Therefore the preferred embodiment provides guaranteed uniform service in satisfactorily completing all the users' transactions in an acceptably short period of time.

B. System Components

Figure 6A:
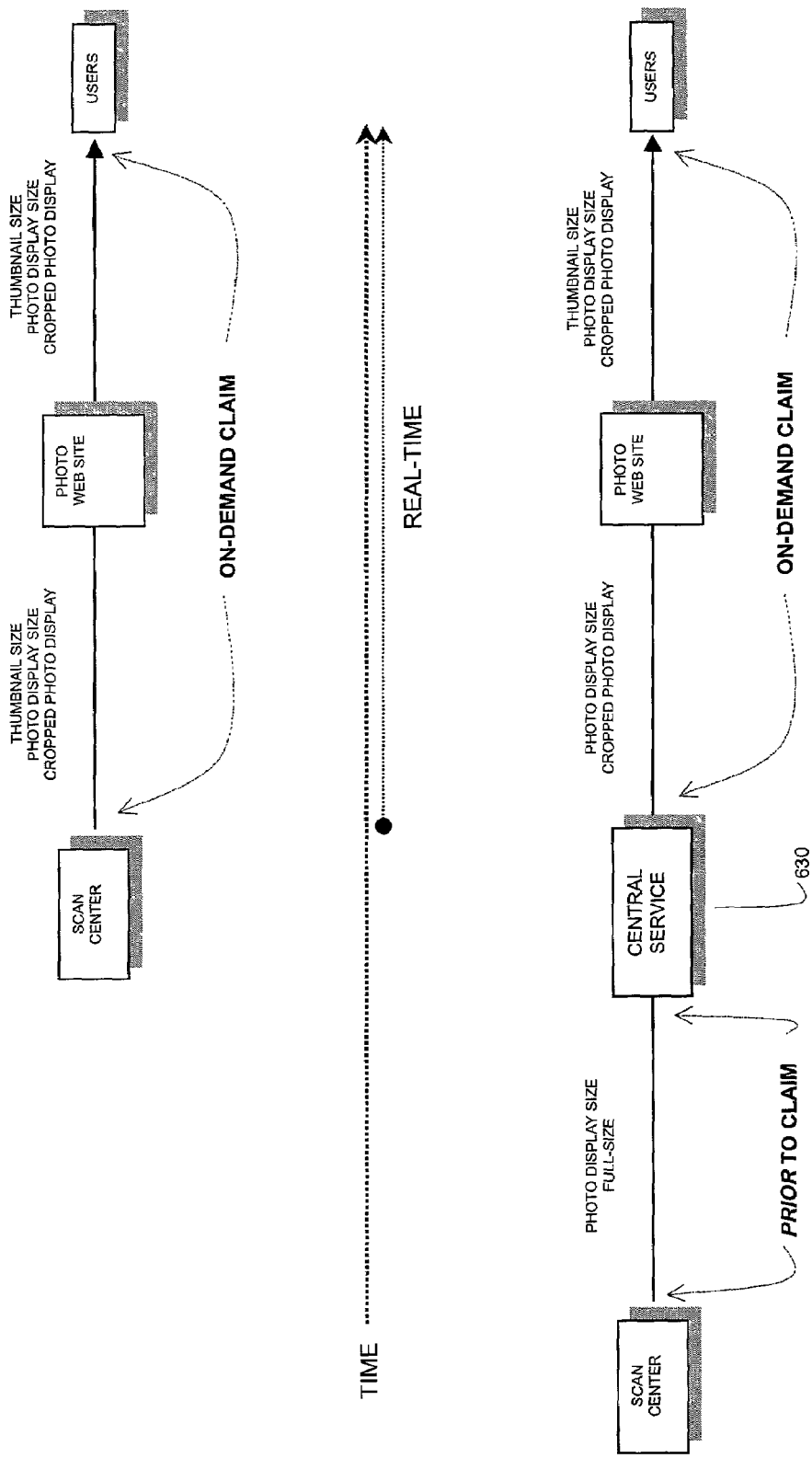
FIG. 6A is a block diagram contrasting the manner in which the three image formats are distributed by which facility in the prior art system versus that of the preferred environment.

FIG. 6A is a block diagram illustrating the existing (prior art) system in the top half of the diagram. It is contrasted against the preferred embodiment, which is illustrated in the bottom half of the diagram. A time line (with the passage of time represented as going from left-to-right) is shown in the middle of the diagram and applies to both systems. In particular, the diagram contrasts the manner in which existing image formats (e.g., thumbnail size, photo display size, and full size) are distributed by the prior art system versus that of the present invention.

More particularly, in existing systems, the thumbnails and the photo display size images are sent across the Internet on-demand from a scan center to a photo web site on to the user for every claim. Whenever an on-line transaction involves cropping enhancements, the photo web site transforms the cropped area from within a full-size image to a new enlarged photo display size photograph, and sends that across the Internet on-demand to a user. The present invention, however, changes this approach.

In the preferred embodiment, which has incorporated a central service 630 within the network, all of the photo display size and the corresponding full-size images are sent to the central service 630 prior to claims on-demand. Then whenever a user submits an on-line claim, the central service 630 sends the photo display size images to the photo web site. That photo web site transforms the photo display size images to corresponding thumbnails, and sends both the thumbnails and the photo display size images on to the user. Whenever an on-line transaction involves cropping enhancements, the photo web site requests the full-size photo from the central server and transforms the cropped area from within a full-size image to a new enlarged photo display size photograph, and sends that across the Internet on-demand to a user.

The present invention is able to transfer all of the photo display size representations and most of the full-size representations of every photograph from all the scan centers to the central service facility in time for the on-line requests for them by making use of the one-to-three day latency between when the scan center digitizes the pictures and when the customers can initially submit their claim on-line to view these pictures. This time window exists because the photographic digitizing, or scanning, of the pictures is done during the one-to-three-day period when the film is being developed and the prints are made. For some small number of full-size photos, a request is made by the central server to the scan center via HTTP.

The currently limited Internet bandwidth between the scan centers and the central service is sufficient to transfer all of the photo display size images in that time window now that the scan centers are no longer servicing the on-demand claims. However, that bandwidth is not capable of transferring all the full-size images, insofar as the data inherent in the full-size format is an order of magnitude greater than for the photo display size format. Therefore, the preferred embodiment currently employs two distinct distribution channels between the scan centers and the central service to transfer the batches of the two images sizes. The pre-existing Internet connections at the scan centers are used to upload the photo display size images to the central server(s), and a higher-volume mechanism, air-express shipping DLT tapes, is used to transport the full-size images to the central service. The preferred embodiment can, however, use a single Internet distribution channel to also transfer the full-size images to the central service when higher Internet bandwidth becomes economically feasible. This is currently done for a small number of scan centers.

The volume of digital image data is manageable within the throughput of the preferred embodiment. The average scan center processes about 300 rolls per day, and the maximum any scan center could process is about 300 rolls per hour. Considering that a roll of full-size digital images is between 15–18 megabytes and that a roll of photo display size digital images is about one megabyte, 60 scan centers average a daily throughput of about 300 gigabytes for all the full-size images and another 20 gigabytes for all the photo display size images. The preferred embodiment is capable of uploading the maximum volumes, which are approximately 24 times this average, while concurrently servicing the on-demand claims by the users.

Although the preferred embodiment delegates to the central server the claim functionality of downloading a roll of photo display images to a photo web site on-demand, the processing of thumbnail images is the responsibility of the photo web site services which are the final nodes on the Internet between the central server(s) and the users. When the user makes an on-demand claim and the claimed roll of photo display size images gets to a photo web site, a corresponding roll of thumbnail images is generated just-in-time by the photo web site services. Both the transformation and delivery of a roll of thumbnails to the users on-demand is delegated to the photo web site services in the preferred embodiment, because the thumbnail format involves a small amount of data and is, therefore, a very quick and easy process.

After the first time a claim for a roll is fully executed, copies of its thumbnail images and photo display size images are stored at the photo web sites so as to enable very fast reclaiming experiences for the customer or for sharing with others. The expiration period for a photo web site to maintain the copies for fast reclaiming is dependent upon the capacity of the disk(s) at that site.

Figure 2:
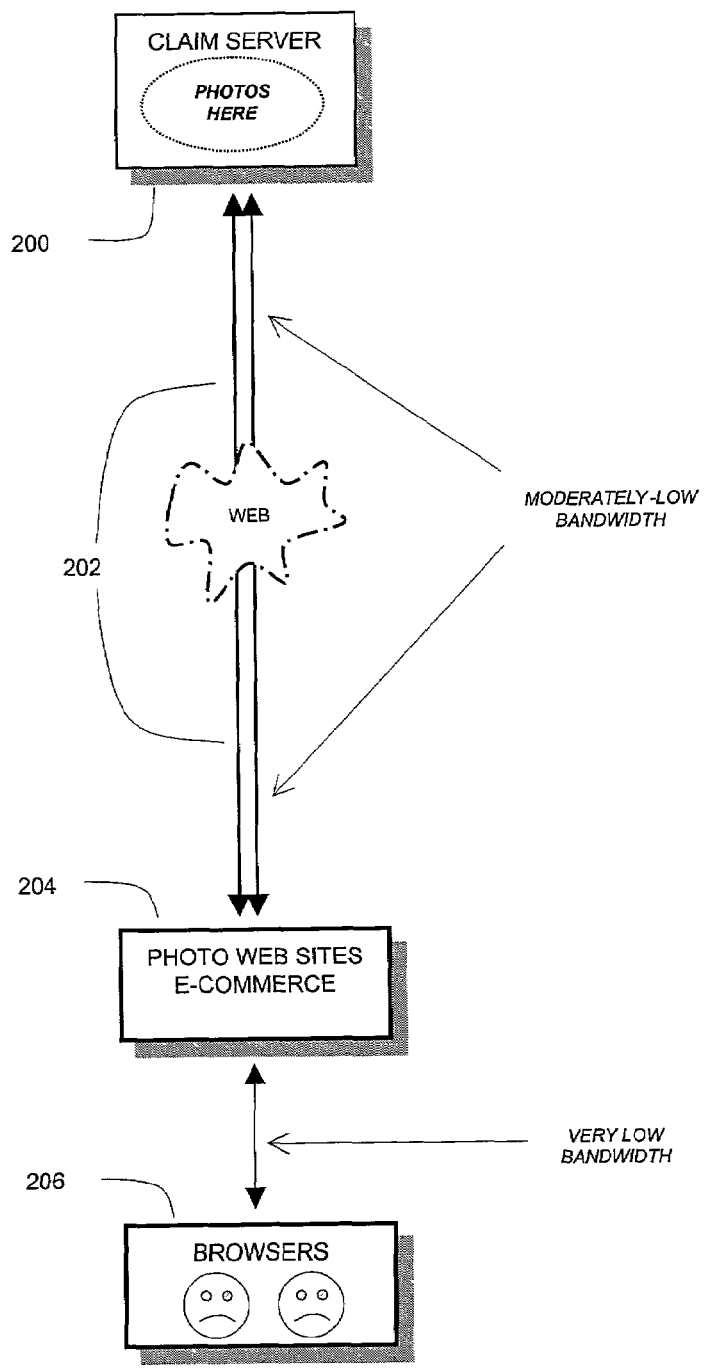
FIG. 2 is a block diagram illustrating the currently bandwidth-deficient claiming service for photo e-commerce on the Internet.
Figure 3:
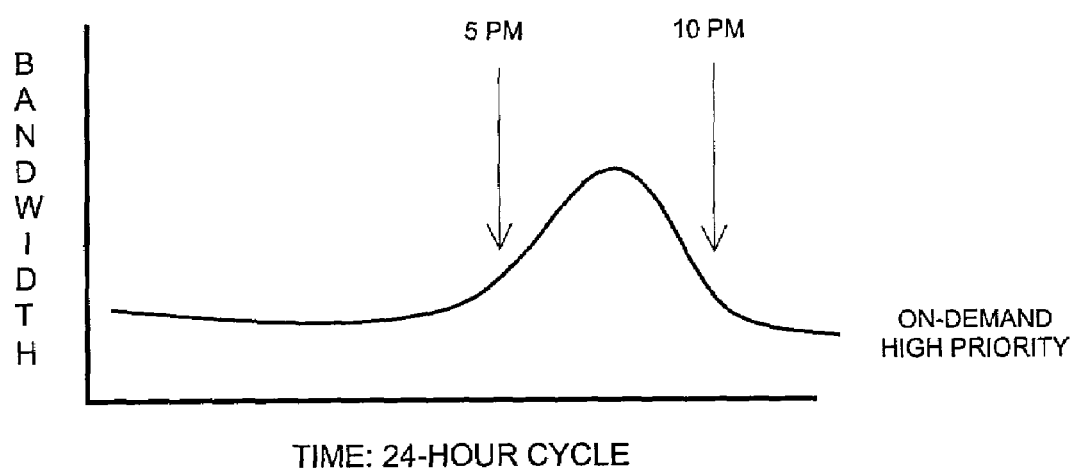
FIG. 3 is a block diagram correlating variation in bandwidth needs for the scan centers' claim service with the consumers' "rush-hour" web traffic.
Figure 6B:
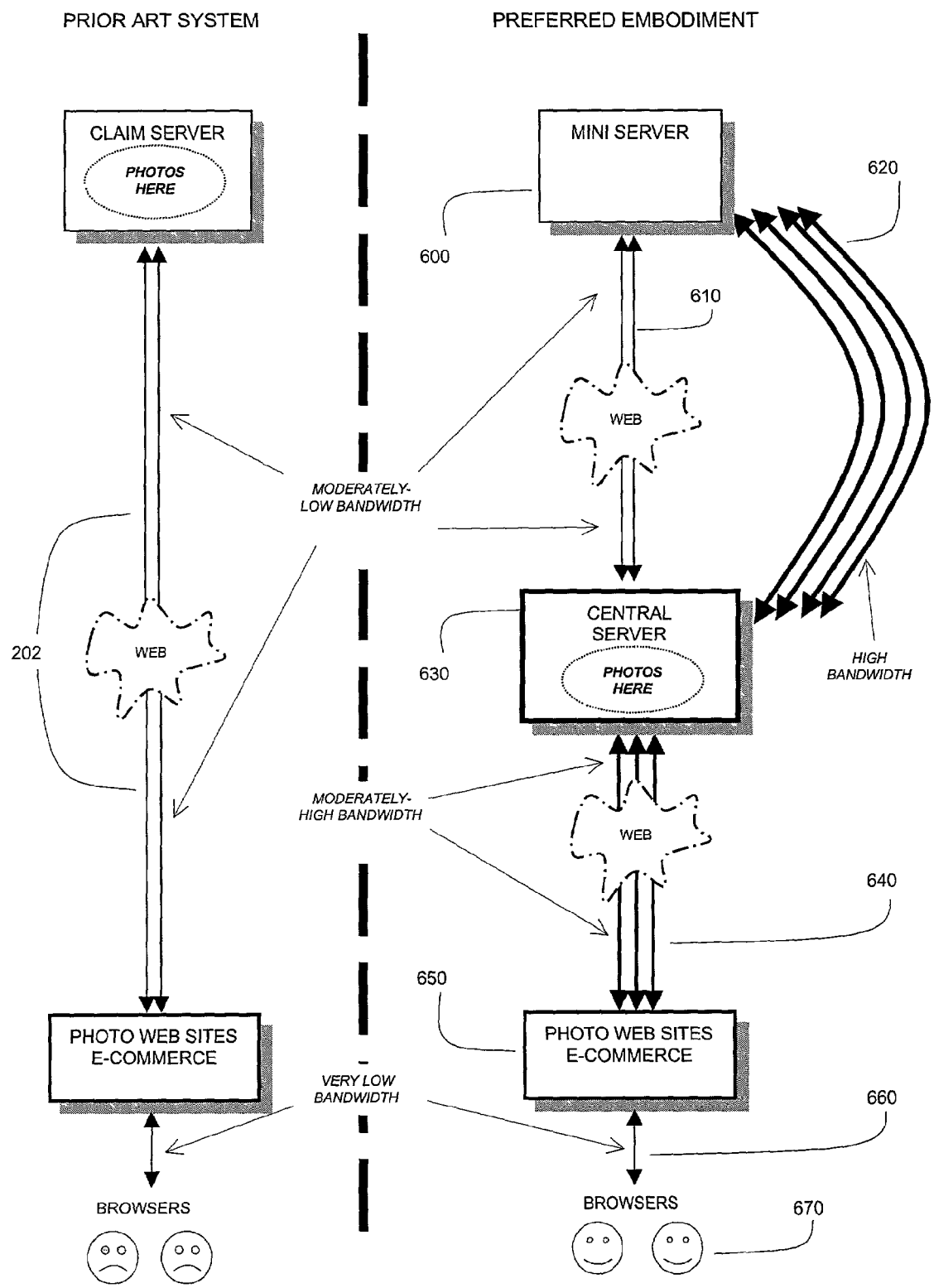
FIG. 6B is a block diagram illustrating the components and their varying bandwidth connections involved in preparing for and servicing on-demand claims in both the preferred embodiment and in the system for the prior art.

FIG. 6B is a block diagram illustrating the components and their varying bandwidth connections involved in preparing for, and servicing, on-demand claims in the preferred embodiment, as contrasted with the system for the prior art. The diagram in the left column in FIG. 6B reproduces, for convenience of comparison, the diagram of the prior art system previously illustrated in FIG. 2. The diagram in the right column of FIG. 6B specifies the system components employed for the system of the present invention. As shown, the preferred embodiment includes a mini server 600, moderately-low Internet bandwidth 610, high bandwidth 620, a central server 630, moderately-high Internet bandwidth 640, photo web sites providing e-commerce 650, very low Internet bandwidth 660, and users with their browsers 670. These components will now be described in further detail.

The mini server 600 manages the scan center, and transfers batches of images it digitizes from photographic prints to the central server 630 before those images can be claimed by the users 670. The central server 630 "pre-fetches" the photo display size image batches from the mini server 600 via the moderately-low Internet bandwidth 610 connecting the central server 630 to the mini server 600. The central server 630 employs the Hyper Text Transport Protocol (HTTP) communication mechanism to request the mini server 600 to send the photo display size images as a low-priority continuous 24-by-7 transmission over the moderately-low bandwidth Internet connection. This ensures that all of the rolls of photo display size images generated at the scan center are locally available to the central server 630 prior to users 670 claiming them on-line. The mini server 600 transfers nearly all of the full-size images it generates onto DLT tape locally, for proactive shipments via overnight carrier 620 (e.g., Federal Express, Airborne Express, DHL, or the like). A small number of mini servers send both the photo display size and the full-size images via HTTP. Because of the massive volume of data representing the batch of full-size images, transport 620 accommodates high-bandwidth transfer of information, whether that be tape-based, Internet-based, or otherwise.

In the prior art system illustrated in the left column of FIG. 6B, the caption "PHOTOS HERE" is located with a claim server at a scan center. In contrast, the preferred embodiment illustrated in the right column of the figure puts the same caption "PHOTOS HERE" with the central server 630 at the central service facility. These relative positions for the digital photographs indicate their available location whenever on-line users 670 claim them on-demand from a photo web site 650 via their modems having very low Internet bandwidth 660. The preferred embodiment can deliver the rolls being claimed much quicker than can the prior art system for two reasons: the central server 630 is much more facile than is the claim server, and the moderately-high Internet bandwidth 640 connecting a central server 630 to a photo web site 650 delivers much more throughput than the moderately-low Internet bandwidth 202 connecting a claim server 200 to a photo web site 204.

Returning a photo display size image to a user request is the most common, and most time-critical, responsibility of a photo web site 650. Full-size images cannot be transported from photo web sites 650 to the users 670 in an acceptable time frame, considering current user bandwidth 660 limitations, but photo display size images can. Therefore, the photo display size is the most appropriate format for browser viewing. The primary logistics of the preferred embodiment is to have the customer's roll(s) of photo display size images locally available to the central server(s) in the majority of cases prior to his or her on-line request to view them.

Because the transmission of the photo display size images from the mini servers to the central server(s) does not require high bandwidth, the relative low-bandwidth connections from the mini servers to the Internet are sufficient for the complete pre-fetching of all of the photo display sizes images from the scan centers. However, the transmission of the photo display size images from the central server(s) to the photo web site, which is on-demand, does necessitate a much higher bandwidth 640, especially during peak periods of customer requests in real-time.

The frequency of employing full-size images on-demand is considerably less than for photo display size images, as the full-size images are only used for the real-time cropping for enhancement e-commerce. Transferring the full-size images from the repository local to the mini servers to the repository local to the central server(s) certainly requires as high a bandwidth as possible, because the full-size image format involves so much data.

Therefore, the currently-preferred embodiment uses another transport mechanism for the batches of full-size images from the mini servers to the central server(s). The currently-preferred embodiment stores the full-size images on DLT tape, and transports them daily (off-line) via overnight shipping (e.g., Federal Express) to the central server(s). This transport deployment is sufficient to successfully deliver the full-size images within the one-to-three-day window before customers can begin claiming their images on-line. A small number of full-size photos are transported via HTTP. Third party shipping of tape archives is the delivery mechanism for the currently-preferred embodiment's highest bandwidth (as shown at 620 in FIG. 6B).

The limiting bandwidth between the mini servers and the central server(s) are generally between 128 kilobits (ISDN) and a T1 line (that is probably shared rather than dedicated). The bandwidth between central server(s) and photo web sites is minimally a dedicated T1 line, and an implementation could easily deploy higher. Although the currently-preferred embodiment employs over-land shipping of DLT tapes for the highest necessary bandwidth to transport the full-size images from the mini servers to the central service, the present invention has also implemented an HTTP module for this functionality that should be cost-effective when higher Internet bandwidth becomes available. The central server(s) pulls a small fraction of the full-size photos from the mini server via HTTP for on-demand enhancement e-commerce as well as both image formats via HTTP for some small fraction of the scan centers.

In the preferred embodiment, HTTP is the Internet communications protocol used between the central server(s) and the mini servers (as shown at 610 in FIG. 6B) and between the central server(s) and the photo web sites (as shown at 640 in FIG. 6B). Typically, the Internet connections between the photo web site servers and the users (browsers) also use HTTP. Although communication between the central server(s) and the mini servers employs HTTP in the currently-preferred embodiments, other network protocols may be employed instead, if desired.

The transport of images is essentially from the mini servers at the scan centers (as shown at 600 in FIG. 6B) to the users' browsers (as shown at 670 in FIG. 6B). Therefore, the flow of HTTP requests is essentially from the users during their on-demand claiming, or from the central server(s) during the pre-fetching of the images. The central server(s) and the mini servers have a reciprocating client/server relationship; however, the central server(s) is primarily a client to the mini servers. On the other hand, the central server(s) is exclusively a client to the photo web sites.

C. Scan Centers Process Digital Images

Getting the digitized images from the scan centers to the central service involves much more than just bandwidth considerations. Each scan center has a single mini server, which is unaware of any of the other mini servers or other scan centers. Each mini server runs the computerized operations local to the scan center and communicates across the network with the central server(s). A mini server orchestrates many local operations, such as processing, tagging, and storing digital photographs at the scan center itself in addition to synchronizing with the central server to ensure a guaranteed reliable transfer of all the images at a harmonious rate both for pre-positioning the images for the users' claims on-demand and for modulating the runtime load on the mini server.

Figure 7:
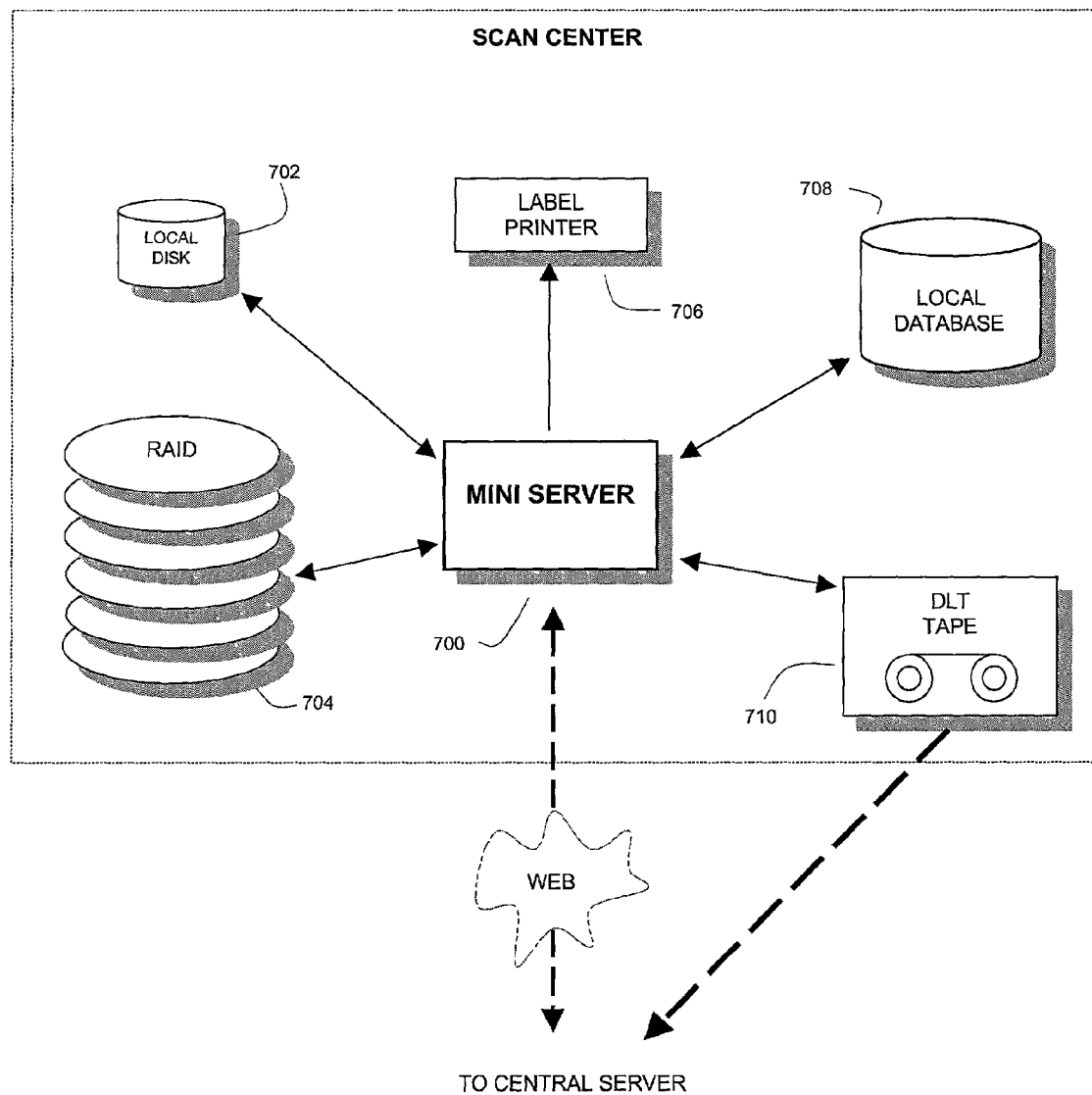
FIG. 7 is a block diagram illustrating the components at each scan center managed by its local mini server.

FIG. 7 is a block diagram illustrating the components at each scan center managed by its local mini server. As shown, the preferred embodiment includes a mini server 700, a relatively small local disk 702, a 500-Gigabyte RAID repository 704, a label printer 706, a local database 708, and a DLT tape drive 710. These will be described in further detail.

The component architecture of a scan center is a LAN driven by a mini server 700. The mini servers are remotely distributed platforms running the Windows® NT 4.x operating system on a suitable server computer (e.g., as previously described above). Initially each roll of film is scanned to produce a full-size digital image of each photograph, which the mini server 700 temporarily saves on the local disk 702. At the completion of locally saving each roll, the mini server copies the full-size images to the larger RAID repository 704, where they remain until the central server assures the mini server 700 that copies of the roll of full-size images have been successfully delivered to, and saved in, the central service repository. The mini server 700 generates a unique ten-digit claim number, and instructs the label printer 706 to print this number on a label that will be attached to the photo prints that will be sent to the retail photo drop-off shop for the customer. The mini server 700 records the metadata for each roll on the local database 708. Then, the mini server 700 deletes that roll from its local disk 702. After the RAID 704 fills up to a certain point, and when the load on the mini server 700 will allow, the mini server 700 copies these rolls of full-size images to DLT tape 710.

The photo display size representations of each digital photograph are not stored on the RAID 704 nor on the DLT tape 710. Upon request from the central server, the mini server 700 concurrently transforms each full-size image in the target roll to the photo display size format (on-the-fly) and transports them across the Internet to the central server that requested that roll. This photo display size format is generated from a standard cubic interpolation algorithm. However, any algorithm can be used. It is a matter of performance versus quality of the image. When this transformation is done using cubic interpolation, it is a slower algorithm but it produces higher-quality images. The preferred embodiment accepts three types of scaling operation algorithms: cubic interpolation, linear interpolation, and nearest neighbor. The transformation done at the photo web sites, from the photo display size down to a thumbnail size, may also use any of these three algorithms. Then, the rolls of full-size images that are copied from the RAID 704 to the DLT tape 710 remain stored on the RAID 704 until notified by the central server to delete them. The central server sends this notification after successfully copying (and verifying) them to its central repository from the tape that was shipped via overnight service.

The mini server is a multi-threading environment that basically executes seven main threads, often concurrently, which are dedicated to the following processing:

(1) Process ICM Files—This thread reads the new roll information and adds this to the database.

(2) Process Rolls—This thread processes new rolls found in the database and performs the following functions:
 a. Generates a roll ID and prints the claim code on the label.
 b. Copies new roll information in the local database and the roll ID to the DLT tape.
 c. Generates a tape ID and copies new tape information in the local database.
 d. Moves the roll files from the local disk to the RAID drive.
 e. Updates the roll status in the database.
 f. Transforms (on-the-fly) the full-size images down to the photo display size upon the pre-fetching demand from the central server(s).

(3) Process Tapes—This thread physically writes all the roll files and metadata to the DLT tape when the number of RAID-saved rolls reaches a certain size.

(4) Process Logs—This thread logs events such as database access, image transformations, or requests from a central server, and records them in the database.

(5) Delete Rolls—When the central server has all needed information of a roll(s), it instructs the mini server to delete the roll(s) from the scan center's RAID and database.

(6) Database API Interface—This thread uses open standards ODBC calls into the local database, setting and getting the metadata for the rolls of full-size images on the RAID repository. The types of metadata concerning a roll of film would include such information as the claim number, the number of images on that roll, its location on the RAID, the expiration date, logs of the different these processes, what tape the roll is on, the number of pictures on the roll, etc.

(7) Server API Interface—This thread can access all files and information of the components at the scan center, and communicates with the central server(s) via HTTP. The following are examples of its functionality:
  a. It returns a list of new rolls in the Extensible Mark-up Language (XML) format.
  b. It acknowledges that a roll of photo display size images was successfully obtained (pre-fetched) by the central server.
  c. It acknowledges that a tape of full-size photos was successfully obtained (off-loaded and stored) by the central server.
  d. It returns a single photo display image (batch pre-fetching) via HTTP to the central server(s) on request.
  e. It returns a single full-size image via HTTP to the central server(s) on-demand by the user for purposes of enhancement.
  f. It generates or regenerates a tape by HTTP request.
  g. It provides an administrative interface to all information maintained in the scan center's database to return to the central server's administrative requests for reporting information via HTTP and HTML.

D. Central Service Processes Claims On-demand

The basic unit of work within the central service or any operation at a mini server that is directed by the central server is the task. The central server(s) and the mini servers are multi-threading platforms that allow the infrastructure to run multiple tasks and operations concurrently, and to modulate the relative time-critical processing among them. The system has a multitude of different, and usually recurring, tasks for the central server to perform. Their scheduling is queue-based, which pipelines them efficiently in a multi-threaded environment. The central server is an embodiment of Java servlets and API running in a Java™ Virtual Machine (JVM) in a multi-threaded environment. A central server's tasks are carried out by various servlets running in the JVM. These servlets run as primary threads, which execute a sequence of coordinated threads that process related sub-tasks. The central server's threads are called from a thread pool, and they can run any task or sub-task. The mini servers, on the other hand, do not employ a JVM environment, and their threads are usually dedicated to the operations performed locally. However, the relationship between the central server(s) and the mini servers is virtually that of master-slave, wherein some central server's tasks invoke the distributed processing between the central server(s) and the mini servers.

Figure 8:
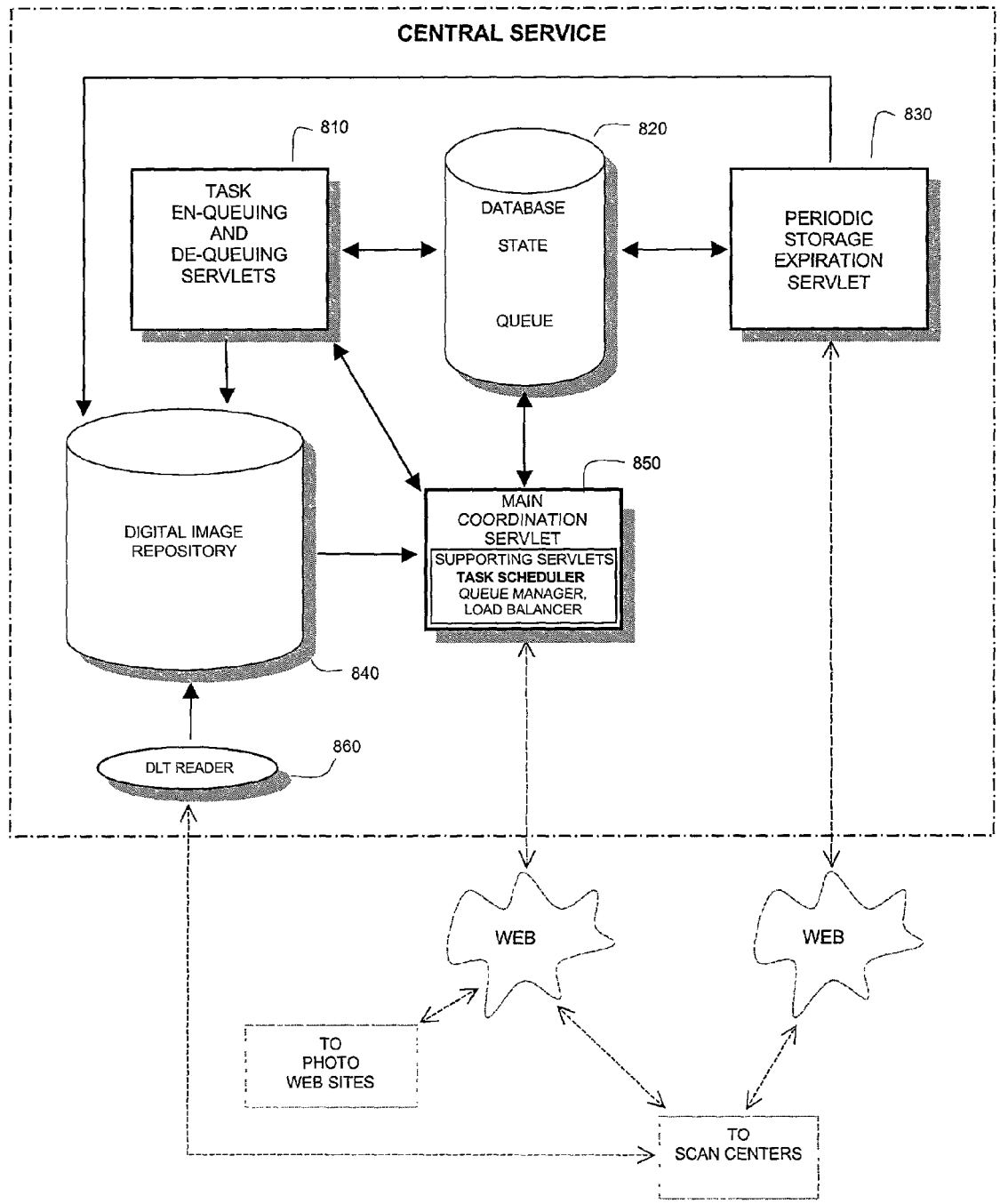
FIG. 8 is a block diagram illustrating the major components, servlets, and their relationships at the central server facility.

FIG. 8 is a block diagram illustrating the major components, servlets, and their relationships at the central server facility. As shown in FIG. 8, the preferred embodiment includes servlets that en-queue and de-queue tasks 810, a local database 820, an expiration servlet 830, a very large repository for all of the digital images 840, a main coordination servlet 850, and a DLT tape reader 860. These components will be discussed in further detail.

The central server component is represented in FIG. 8 by the servlets 810, 830, and 850. The central service may employ one or more central servers, running on one or more computer servers. The currently-preferred implemented central service has deployed two central servers, each running on a Sun computer and using the Solaris 7 operating system (available from Sun Microsystems of Mountain View, Calif.). Each central server functions both as an application server and a web server. The present invention has demonstrated that two central servers can efficiently service the 60+mini servers deployed at the remote scan centers. These two central servers share a common database 820 that maintains state information and the task queue. Because multiple central servers share a database and communicate with each other only via the state in the database, they should be physically in close proximity for maximizing the central service performance. This database can consist of one or more databases; however, the preferred embodiment uses only one for simplicity. The database itself may comprise Oracle8i or later, available from Oracle Corp. of Redwood Shores, Calif.

The central service employs a large shared-disk repository 840 for storing the large volume of both photo display size and full-size images that originated at the scan centers. The batch deliveries of the photo display images are warehoused in the digital image repository 840 by servlets 810 that forward a request to the mini servers over the Internet for those images by way of the Task Scheduler servlet 850. The batch deliveries of the full-size images are offloaded to the digital image repository 840 by a DLT device 860 that reads the tapes after they arrive from the scan centers via overnight shipping. The repository for the central server(s) can store the enterprise's photographs (full-size and photo display size) for 30 to 120 days. It is more cost-efficient to scale the storage at the central server than to scale the storage at each scan center. The individual retailers can request specific expiration periods for their customers' rolls, and the central service database can associate that specified expiration attribute to all rolls from that customer facility. An average (30-day) digital image storage capacity, would amount to approximately 10 terabytes for an on-line enterprise comprising 60 average scan center volumes.

A benefit of the massive central service repository also unburdens the storage requirements for each scan center. First of all, the scan centers do not continue to store the photo display size images as does the central service. The scan centers only store the full-size images for a short time, until their tapes have been off-loaded by the central server(s), and subsequently instructed by the central server(s) to purge their RAID storage. The mini servers transform copies from their rolls of full-size images into photo display size images upon request from the central server(s), and immediately transfer them, via HTTP, across the Internet in response to the central server(s). Asynchronously the scan center's RAID storage (holding the rolls of full-size images) back-ups the full-size images to a DLT tape drive, which will subsequently be shipped, off-line, overland, to the central service facility.

The digital images are stored on one or more large disks, but their associated metadata is saved in the database 820, and the tasks of the central server depend upon this metadata. All of the servlets running in the central server 810, 830, and 850, perform tasks that are database-driven, thereby determining their parameters from the state within the database tables and maintaining that state. These servlets access the database by calling standard Open Data Base Connectivity (ODBC) methods, which invoke stored procedures in the database to get/set (fetch/put) field values from a task table in the database. If an implementation employs multiple central servers, they share the common central service database, and they operate from the same task queue. The queue itself is not in-line; rather it is a composite based upon state that is maintained in a central server database. The database schema consists of many tables; the most significant being the following tables:

(1) ROLL_T—The roll table contains information about the rolls of images.
(2) TAPE_T—The tape table contains information about the tapes.
(3) TASK_T—The task table contains state information for the tasks, load balances, and the tasks' scheduling (and thus also comprises the queue). Only the Queue Manager (as shown at 850 in FIG. 8) operates on this table to de-queue a task.
(4) SCAN_CENTER_T—The table contains information about the scan centers. This table contains the locking semaphore used to ensure that only one central server issues a task (on the queue) for a particular scan center.

All of the servlets can access the database state directly, and some of them can en-queue tasks. However, only the Queue Manager thread invoked by the main coordination servlet 850 can de-queue a task, yet it can both en-queue and de-queue tasks. The task en-queuing and de-queuing servlets must ask the Queue Manager 850 to process their de-queuing requests as shown by the bi-directional arrow connecting those servlets 810 and the Queue Manager servlet 850. In the case of multiple central servers, each central server's main thread also processes the Queue Manager functionality 850. The following is a list of the subordinate servlets, some of which participate in the en-queuing and de-queuing operations:

(1) Roll claim Host—The Roll Claim Host en-queues the sub-tasks necessary to retrieve a roll of photo display size images from the mini servers via the Internet.
(2) Scan Center Roll Claim Processor—The Scan Center Roll Claim Processor executes the sub-tasks en-queued by the Roll Claim Host.
(3) Tape Volume Processor—The TapeVolumeProcessor servlet (not shown) restores the tape 860 to the repository 840, and records in the database 820 the storage location for each roll in the database, their expiration periods, and any other necessary metadata for each roll. The TapeVolumeProcessor runs at a low priority and is not queue-based.
(4) Roll Expiration Processor—The RollExpirationProcessor servlet deletes both the full-size and photo display size images for a roll from the digital image repository 840 when its expiration deadline is met. The RollExpirationProcessor wakes up once a day, and looks in the database 820 to determine if 30 days have passed since any particular roll(s) have been stored in the repository; 30 days is the typical and arbitrary period before expiration. The RollExpirationProcessor servlet en-queues a task in the task queue. The RollExpirationProcessor runs at a low priority.
(5) Check For Late Tapes Processor—The CheckForLateTapesProcessor servlet wakes up once a day, and looks in the database 820 to determine if three days have passed since a mini server had successfully transferred the (tape's worth) of photo display size images and yet the corresponding tape has not yet arrived at the central service facility. In this case CheckForLateTapesProcessor notifies the corresponding mini server to re-send that tape. This servlet also asks the mini server to regenerate and send that tape in the event that there was an anomaly with the tape that did arrive at the central service facility. The CheckForLateTapesProcessor servlet en-queues a task in the task queue. The CheckForLateTapesProcessor runs at a low priority.
(6) Scan Center Meta Data Processor—The Scan Center Meta Data Processor initiates the central server pre-fetching the rolls of photo display size images from a mini server. The Scan Center Meta Data Processor en-queues the task that will request a mini server to send a list of rolls that have not been transferred, via the Internet, to the central server. For each roll in the XML list, a new task is en-queued which will request a transfer of the roll from the mini server to the central server.
(7) Administration Server—The Administration Server (not shown) is a User Interface (UI) on the central server and allows for an employee to query its database or a mini server's database for investigation and reporting purposes. This provides a manual audit functionality that can be used to determine answers to questions regarding the processing of a customer's roll(s). The Administration Server can only read database information, except to modify the expiration period for a particular retail outlet's request.

The most important role of the main coordination servlet 850 running in the central server is that of a monitor, a.k.a. the Task Scheduler, brokering the en-queuing and de-queuing requests of other threads and servlets also running in the central server. The Task Scheduler 850 provides other primary services, including invoking both the Queue Manager 850 and Load Balancer 850. But whatever the task in operation, it must be appropriately scheduled in the grander scheme of things. The scheduling decisions for all of the servers on the network of the preferred embodiment are commanded by the Task Scheduler 850 running in the central server(s). Different types of tasks have different priorities; e.g., responding to a user request in real-time has a much higher priority than batch processes, such as a central server pre-fetching the photo display size images from a scan center. The priority level for a task and the bandwidth level that it employs have no correspondence. Insofar as bandwidth is not always a variable option, task prioritization is.

One primary high-priority task returns photo display size images on user demand. This is enabled because the photo display size images are already stored at the site of the central server(s) due to the pre-fetching activity. Of equivalent high-priority importance is that the full-size images also be already stored at the site of the central server(s) prior to a user claiming them, because the user may want to do an enhancement involving cropping. In the event that the full size is not at the central server, an on-demand request is made by the central server to the mini server to retrieve the full-size photo when the user initiates the enhancement. Cropping enhancement requires a full-size representation at hand. The full-size versions of the photographs are usually already stored at the site of the central server(s), because the central server(s) had already received and off-loaded them from the DLT tapes sent from the scan centers. However, it is possible that some anomaly prevented the arrival of a tape, in which case the central server will request the appropriate mini server to upload the user's single photo request, in real-time for the user request. Because this is the most time-intensive task running in the most time-critical event (user demand), it has the highest of all priorities.

The Task Scheduler is also responsible for the management of the queue. As a Queue Manager 850 it both en-queues and de-queues tasks from the database queue. Whereas other servlets may en-queue a task, only the Queue Manager can de-queue tasks, because the de-queuing consideration is more sensitive to the tasks' priorities than to their relative position in the queue. The decision to en-queue tasks is often issued by other threads or servlets. A servlet, processing a task, may en-queue other (related) sub-tasks, and, therefore, modify the database directly (as shown by the bi-directional arrow connecting the task en-queuing and de-queuing servlets 810 with the database 820 in FIG. 8). However, only the Task Scheduler, acting as a Queue Manager, can both en-queue and de-queue tasks. The other de-queuing servlets must parlay their requests to de-queue through the Queue Manager.

Queuing may involve nested layers of granularity. For example, when a tape arrives at the central service, an en-queuing servlet, the TapeVolumeProcessor servlet, en-queues a task to read that particular tape from the DLT reader (as shown at 860 in FIG. 8). Additionally, for each roll on that tape, the TapeVolumeProcessor servlet en-queues a task to read that roll. The task to read that tape is de-queued and processed, which involves de-queuing sub-tasks (for each roll on that tape) to read every roll on that tape before the task to read the tape successfully is completed. A task is not really removed from the queue until it has successfully completed after it was de-queued.

Whenever a task is in the queue, the Queue Manager modifies its status (in the database) to one of the following five states:

(1) PENDING—This is the task's state after it has been en-queued, but prior to being de-queued to be run; however, it remains on the queue in its relative position.

(2) PROCESSING—This is the task's state after it has been de-queued and is currently running, but has neither completed nor failed. However, while processing, this task remains on the queue in its relative position. When it successfully completes ("SUCCEED"), it moves to the "DONE" state.

(3) DONE—This is the task's state when it has finished running and was successful. This state allows this task to be removed from the queue.

(4) FAILED—This is the task's state when its processing did not complete successfully ("FAIL"), and this process discontinues. But this task will be re-en-queued by a stored procedure that sets the status (DONE or FAIL). If the status is FAIL the stored procedure also supplies a time, 0-to-N minutes, delay to try to de-queue later. This task will be re-en-queued at the tail of the queue. If this is a high-priority task, it is queued ahead of the lower-priority tasks on the queue. This re-queuing of a task that fails is the preferred embodiment's mechanism for guaranteeing service.

(5) ABANDONED—This is the task's state after it has failed for a specified number of retries. This is a good indication that something is wrong in the software, and that the system should not burden itself needlessly re-trying this particular task. This is useful for background debugging as well.

The main coordination servlet (as shown at 850 in FIG. 8) also manages the load-balancing operations. As previously described, earlier implementations incorporating a claim server at each of the 60 scan centers resulted in 60 points of possible failure. That infrastructure was not scalable, and was very susceptible to isolated claim servers being overloaded, especially during peak busy hours or season. The topology of the preferred embodiment is both scalable and self-regulating for load balancing. With a drastically reduced burden of responsibility for the mini servers, as compared to when they relied on their claim server system, it is not so overwhelming to scale their independent environments. If growth for the enterprise's e-commerce exceeds the capacity of the larger system, one could simply add an additional central server, upgrade the horsepower of the existing central server(s), or add to or upgrade either the database or repository for the digital photos. Although the currently-preferred implementation has deployed two central servers to manage the 60 mini servers among the scan centers, a single central server can operate the system.

The Task Scheduler implements the load-balancing operations across multiple central servers (if there are more than one) that are running tasks that communicate with the mini servers. The synchronization mechanism that exists across multiple central servers ensures that only one central server will en-queue a task for any mini server, e.g., initiating a batch operation to pre-fetch all of that mini server's photo display size images. The Task Scheduler cycles through work for all of the mini servers, but no individual mini server will be able to monopolize a central server's processing capacity or Internet bandwidth. If a task involving a particular mini server remains in the PROCESSING state in the database too long, the central server stops that processing, re-en-queues that task, and modifies its status to PENDING.

The currently-preferred embodiment employs two central server(s) in case a central server experiences a hardware crash. However, the preferred embodiment insures a guaranteed level of service even in the event of failure. The insurance mechanism is the task queue in the database, which is shared among the central servers. Tasks are run as they are de-queued. However, the task is not really marked as DONE until it has been successfully completed. Each central server's task consists of a sequence of sub-tasks, and rather than just performing them in-line, each sub-task maintains the state of its status within the database. If any one of the sub-tasks encounters a problem, the entire (parent) task is re-en-queued, and thus will be retried when it returns to the head of the queue. This is the fail-over mechanism of the preferred embodiment. The finer-grained mid-state status of a sub-task is not maintained, as that would require incredible complexity, bogging down the system with tracking minutia. Only the concluding status of the sub-tasks is state-maintained. This scheme is especially important in an infrastructure that relies on HTTP communication protocols. Since HTTP can fail for various reasons, e.g., an Internet router fails, the Task Scheduler must determine that the task itself has therefore failed, and thus provides a retry facility that guarantees that the task completes successfully.

In the earlier claim server system previously described the distributed network of 60 independent (on-demand) services enabled 60 points of failure. Whenever one claim server would go down, none of the requests by any users for that node were satisfied. The service from that site would have to wait until that server was brought back up. The user-demanding claim service functionality previously distributed across the 60 mini servers is delegated to the central server(s) in the preferred embodiment, noticeably reducing the number of points of failure. The fulfillment of real-time user demand is serviced by the central server(s), and is not affected by a failure or crash of any of the mini servers.

Figure 9:
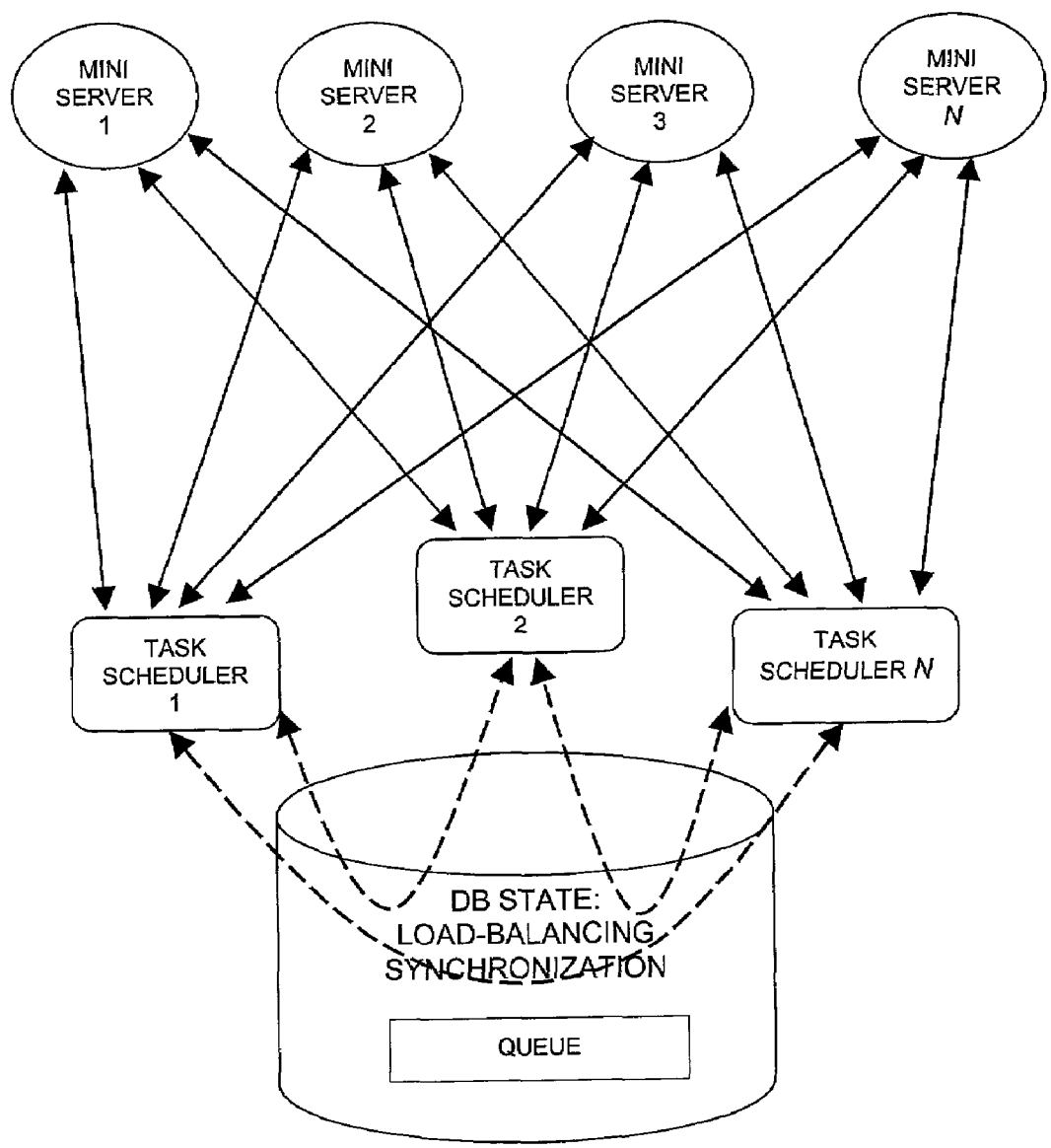
FIG. 9 is a data flow inter-dependency diagram that illustrates the communication topology: the central servers communicate to each other only through the database state.

FIG. 9 is a data flow inter-dependency diagram that illustrates the communication topology: the central servers communicate to each other only through the database state, sharing their load and equalizing the load across the mini servers. The preferred embodiment manifests a harmonious load-balancing regimen among the mini servers and among the central servers (if there is more than one central server). The Task Scheduler(s) (each central server runs a Task Scheduler) monitors both the number of open connections and active jobs for each mini server, and synchronizes the parsing of tasks among them.

The main coordination servlet (as shown at 850 in FIG. 8) manages the load-balancing operations by deploying the LoadBalancer servlet. The LoadBalancer servlet is run by the Task Scheduler to spread the tasking burden across the many mini servers to avoid overloading any of them. When there are no more tasks for a particular mini server in the queue, the next available central server sets a semaphore (in the database), thereby preventing another central server from asking if a mini server has new work. The semaphore lasts for a short configurable period. Each task to get data from a scan center is placed in a queue with the method Enqueue( ).

The Task Scheduler cycles through work for all the mini servers, dynamically modulating the number of job connections available to any mini server, by default to five. However, the capacity of a mini server to perform multiple tasks is also dependent upon its Internet line-size capacity, which varies among the mini servers. The central server(s) does not know what this line size is because it may change over time. Therefore, the LoadBalancer servlet manipulates the state of a COUNT in the database to prevent overloading any particular mini server.

If one or more tasks for a particular mini server begin to fail, the LoadBalancer servlet decrements the COUNT for the number of tasks this mini server can handle concurrently at this point in time, thus decrementing the load the central server dispatches to that mini server. Once the remaining tasks cease to fail on that mini server, and that mini server completes its remaining multiple tasks successfully, the COUNT is gradually incremented to its maximum load capacity (as long as it does not begin to fail again).

The Task Scheduler also handles cases where a node (mini server connection) goes down. It automatically detects when a node comes back on-line, and no data will be lost. The heartbeat, or queue-consumer monitor, task is another load-balancing process. This task submits a test connection HTTP request to each mini server every ten minutes to determine whether the mini server is down. This is important because if a mini server is down (unbeknownst to the central server), then all the tasks for that mini server would fail, and continue to fail throughout their retry attempts. The state for these tasks would therefore be tagged ABANDONED, which would ultimately result in these tasks not being fulfilled—a violation of the guaranteed service intent. If the heart beat task determines that a mini server is down, the central server modifies the COUNT state in the database (which represents the number of tasks operating on that mini server) to a negative value of the maximum number of connections allowed for that mini server. Then when that mini server comes back up (starts re-running successfully), the central server changes the COUNT state to the positive value for the (maximum) number of available connections for performing tasks.

Overall, the preferred embodiment delivers the photo web services consumers expect. The following is the scenario from the customer's perspective: The customer drops off his or her roll of undeveloped film at a convenient depository, such as a drug store with a photo developing service. The film is sent to a development lab, which also functions as a scan center. Immediately following development of the film, the images are digitized at the scan center and put on a local disk (in the full-size format). The scan center packages the film negatives and the (4×6) prints, along with a unique 10-digit claim number which references that roll of digital images. The claim numbers are architected to ensure that a customer's accidentally transposing, or erroneously entering, his or her number cannot result in generating another valid number when retrieving the roll later on-line. It generally takes one-to-three days for this package to return to the place where the customer returns to pick-up his or her photo prints (along with their accompanying claim number).

The customers then go home where they can view their prints. Later, if the customer wants to consider re-ordering more, or enhanced, prints of their photos, he or she could use the appropriate URL to go to the enterprise's web site, where he or she would enter their claim number for each roll of images. A group of thumbnails, representing the appropriate roll of pictures, would appear, enabling that customer to identify particular photo images from amongst the roll. The user may elect to view any picture more fully by selecting the corresponding thumbnail. The photo display size image will appear in a few seconds, progressively rendered from its JPEG format. The customer can elect to share viewing/ordering of these photos on the enterprise web site. An email notification can be sent to friends or family who can then view or purchase the photos. The photo display is very fast because they have been previously claimed from the central server.

When the customer submits the claim number, the central server(s) locates the corresponding roll of images from local storage, and quickly delivers it to the requesting photo web site. The photo web site has a local transform server that rapidly compresses the entire roll of photo display images into thumbnail format. Then the photo web site returns the roll of thumbnails to the customer's browser, and is prepared to quickly return any selected image, in a photo display size format, which it already has on hand.

The customers may use the HTTP shopping cart features of the photo web site to order prints, from their full-size representations, which they select while viewing only the photo display size representations on their monitors. If they want an enlarged print of a cropped area of the photograph, the central server quickly transforms a photo display size facsimile of that area from the full-size representation (as shown previously).

E. Thread-based Processing

The main threads run main tasks that employ other threads to run separate tasks/sub-tasks to implement the larger scenarios. The multi-tasking processing implements the following common scenarios of the central service of the preferred embodiment. The most common task is the central server's pre-fetching of a roll of photo display sizes images from the mini servers over the Internet in a batch process. During the one-to-three day latency for the initial photo printing, the mini servers at the scan centers (one mini server per scan center) transform the full-size images to the photo display size format, and proceed to upload the photo display sizes to the central server(s) site, at the request of the central server. The Internet transfer of the photo display size copies from the mini servers to the central server(s) is a task that runs 24 hours per day, because it is not a response to a user request (on-demand), and it is voluminous. Thus, the central server(s) is constantly pre-fetching all the photo display size images from their originating scan centers via the mini servers. Because the photo display sizes are pre-fetched during the one-to-three day latency between digitization and potential on-demand roll claiming (user viewing), their transfer to the central server(s) is done in batch mode (versus on-demand) having a lower priority for both the central server(s) and the mini servers.

F. Detailed Operation

1. Overall Operation

Figure 10:
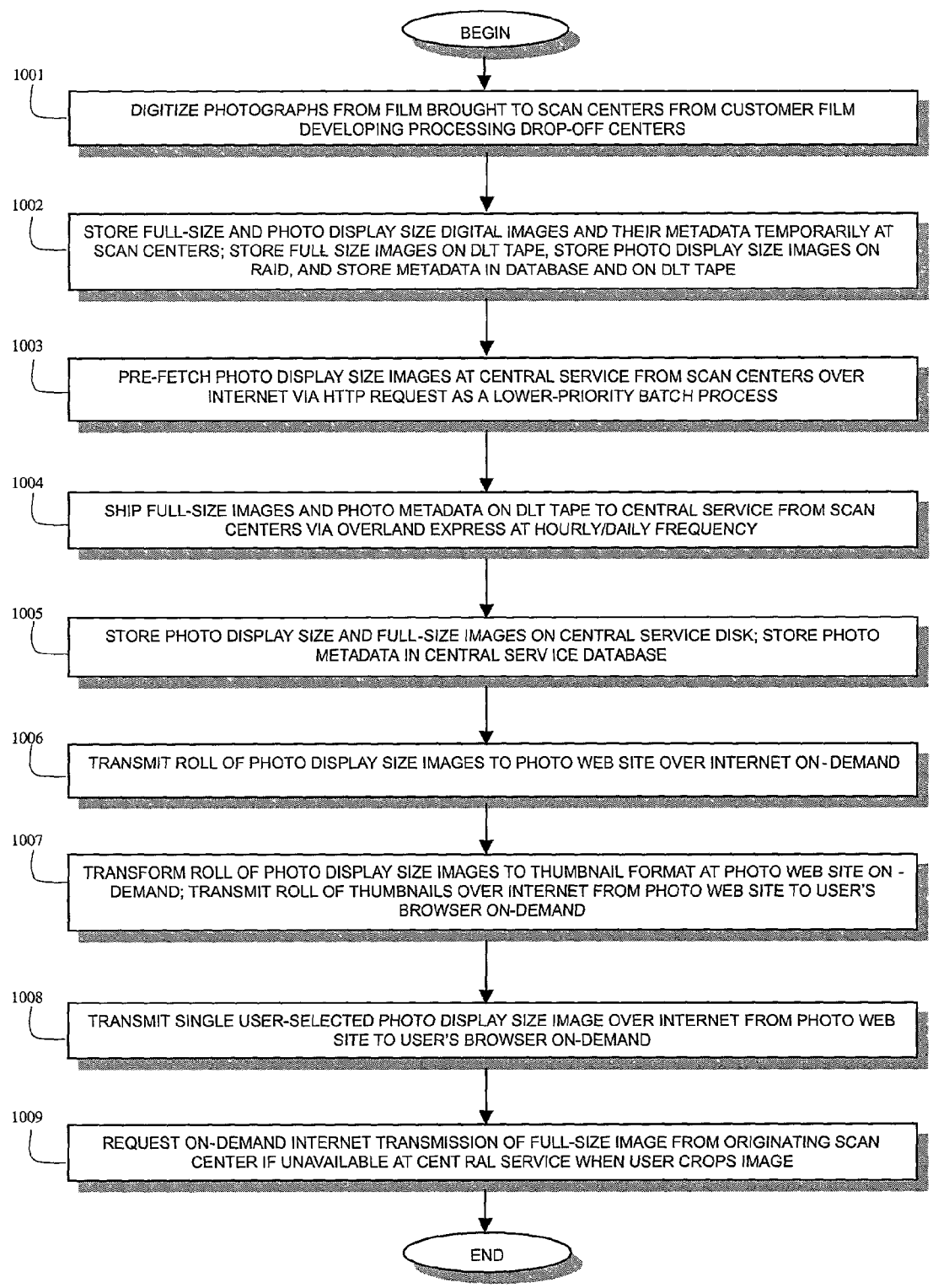
FIG. 10 is a flowchart summarizing the overall operation of the system of the present invention.

FIG. 10 is a flowchart summarizing overall operation of the system. As shown at step 1001, photographs are digitized from film brought to scan centers from customer film developing processing drop-off centers. At step 1002, full-size and photo display size digital images and their metadata are stored temporarily at scan centers; the full-size images are stored on DLT tape, the photo display size images are stored on RAID, and the metadata are stored in a database and on DLT tape. At step 1003, the photo display size images at the central service are pre-fetched from scan centers over the Internet via an HTTP request as a lower-priority batch process. The full-size images and photo metadata are then shipped on a DLT tape to the central service from the scan centers via overland express at hourly or daily frequency, as shown at step 1004. The photo display size and full-size images are stored on a central service disk and the photo metadata is stored in the central service database, as shown at step 1005. At step 1006, a roll of photo display size images are transmitted to the photo web site over the Internet on-demand. At step 1007, the roll of photo display size images is then transformed to thumbnail format at the photo web site on-demand; the roll of thumbnails is transmitted over the Internet from the photo web site to the user's browser on-demand. A single user-selected photo display size image is transmitted over the Internet from the photo web site to the user's browser on-demand, as shown at step 1008. Finally, at step 1009, an on-demand Internet transmission of a full-size image from the originating scan center is requested if it is unavailable at the central service when the user crops the image.

2. Pre-fetching

The most common task is the central server's pre-fetching of a roll of photo display sizes images from the mini servers over the Internet in a batch process. During the one-to-three day latency for the initial photo printing, the mini servers at the scan centers (one mini server per scan center) transform the full-size images to the photo display size format, and proceed to upload the photo display size images to the central server(s) site, at the request of the central server. The Internet transfer of the photo display size copies from the mini servers to the central server(s) is a task that runs 24 hours per day, because it is not a response to a user request (on-demand), and it is voluminous. Thus, the central server(s) is constantly pre-fetching all the photo display size images from their originating scan centers via the mini servers.

Figure 11A:
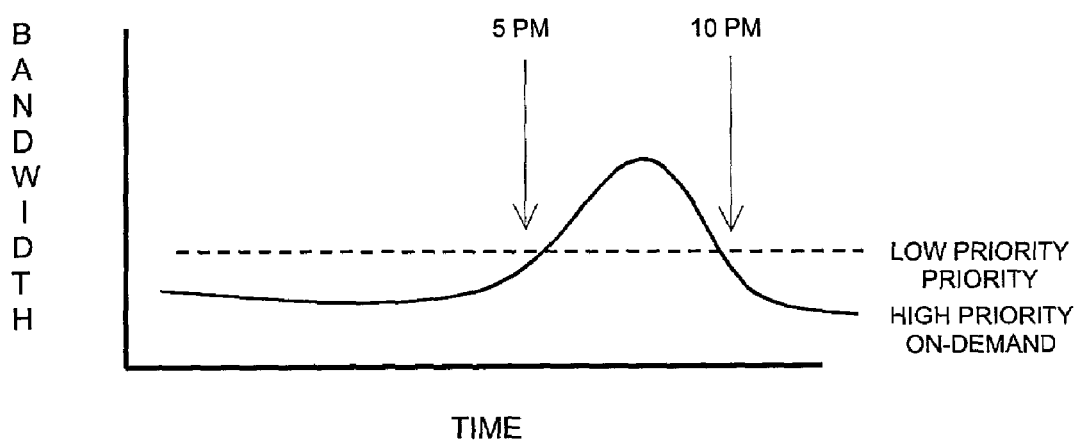
FIG. 11A is a graph comparing the relatively flat bandwidth requirements for the low-priority pre-fetching transfer versus the bandwidth necessary to service the high-priority on-demand requests.

Because the photo display size images are pre-fetched during the one-to-three day latency between digitization and potential on-demand roll claiming (user viewing), their transfer to the central server(s) is done in batch mode (versus on-demand) having a lower-priority for both the central server(s) and the mini servers. FIG. 11A is a graph comparing the relatively flat bandwidth requirements for this low-priority pre-fetching transfer versus the bandwidth necessary to service the high-priority on-demand requests. The area under the dashed line is the bandwidth consumed by the constant pre-fetching behavior of the orchestrated servers, as part of the preferred embodiment, a.k.a., "shoebox."

Figure 11B:
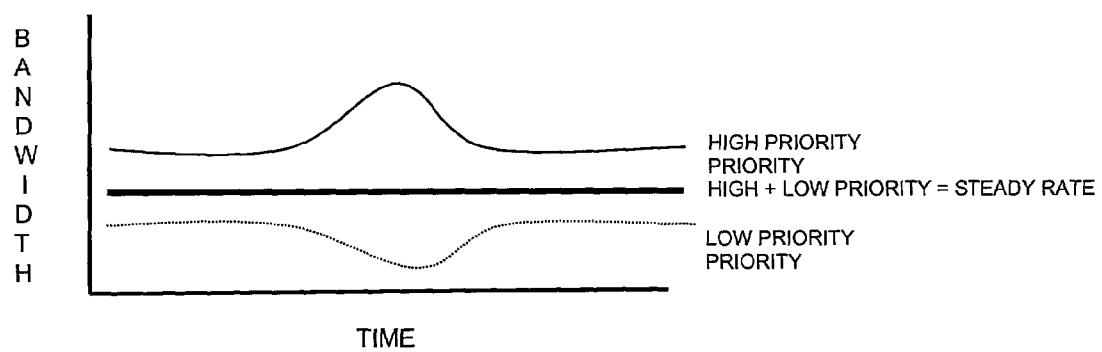
FIG. 11B is a graph illustrating the steady server resource utilization of the "shoebox" system of the present invention.

Although the pre-fetching batch transfer of the photo display size images involves a steady bandwidth consumption rate, there are peak periods for high-priority requests that can impact the overall bandwidth requirements of the central service. FIG. 11B is a graph illustrating the steady server resource utilization of shoebox. When these high-traffic periods of high-priority requests occur, some other low-priority requests are cut back. This results in the average, or flat, bandwidth requirements shown in FIG. 11B. When the load of high-priority requests increases, the Task Scheduler decreases the processing of the low-priority requests. This gives the central server the steady average CPU and bandwidth usage represented by the bold horizontal line in FIG. 11B. It is easier to scale a system that has the steady server resource utilization of shoebox. Most importantly, the first time (on-demand) roll claiming is quicker because the images have already been brought to the local disk area of the central server(s), which has the bandwidth to quickly distribute them to the photo web sites.

Figure 12A:
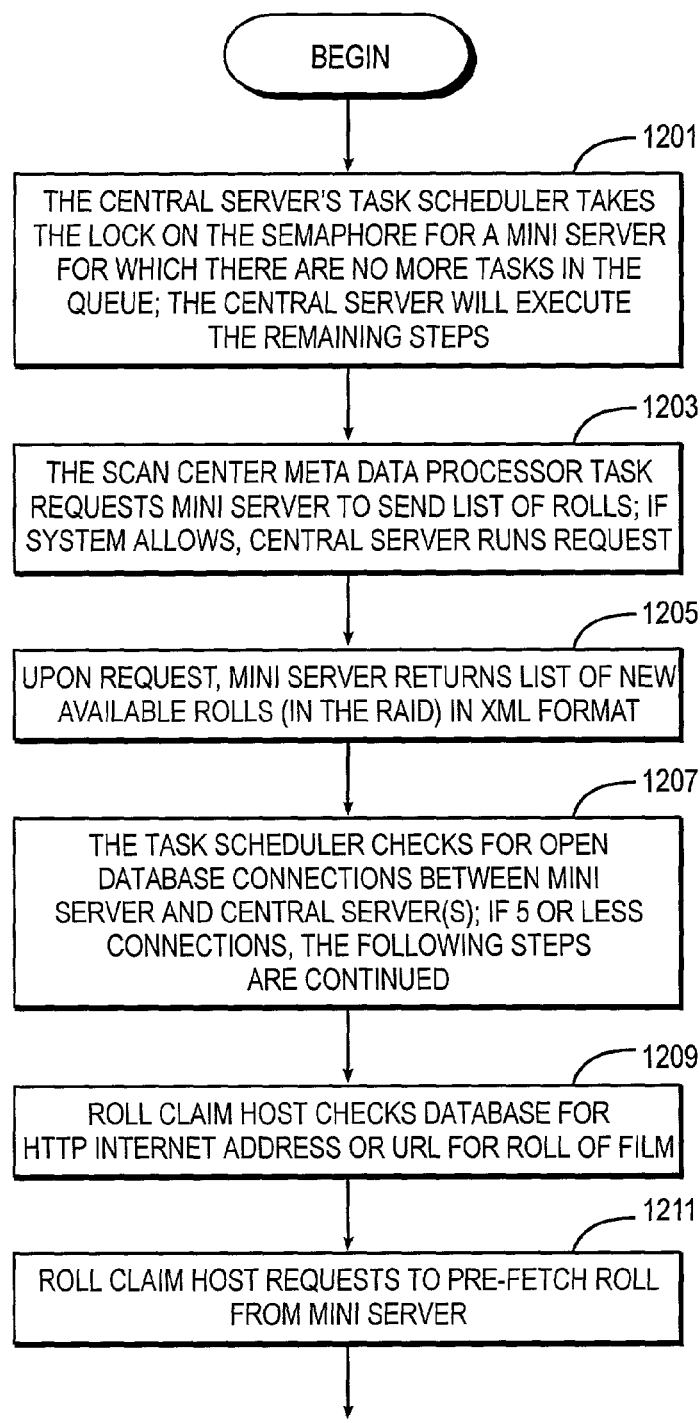
FIGS. 12A–B are flowcharts illustrating the methodology of pre-fetching photo display size photographs over the Internet via HTTP from the scan centers, in a preferred embodiment of the present invention.
Figure 12B:
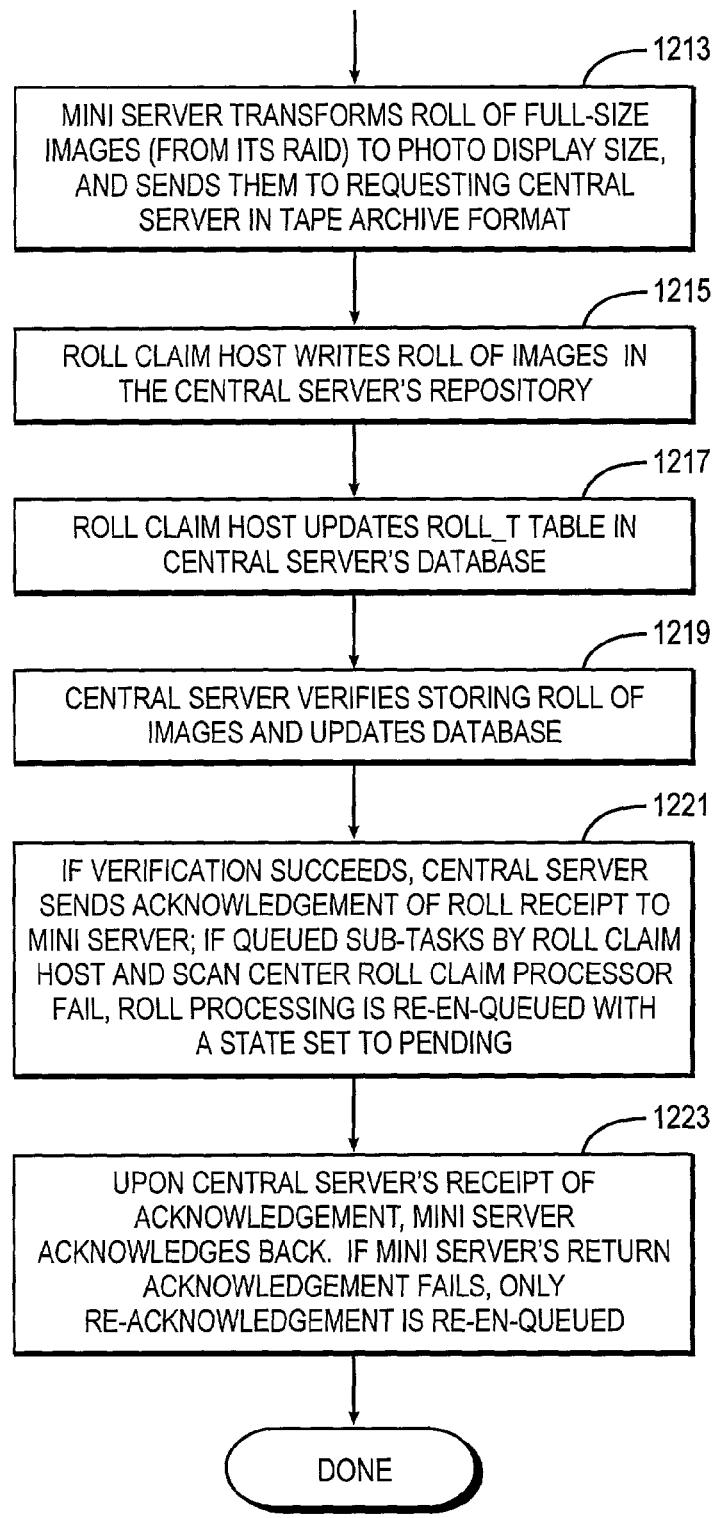

FIGS. 12A–B are flowcharts illustrating the methodology of the preferred embodiment pre-fetching photo display size digital photographs over very high Internet bandwidth, via HTTP, from the scan centers. At step 1201, the Task Scheduler of one central server takes the lock on the semaphore for a mini server for which there are no more tasks in the queue. This central server will execute the remaining steps. At step 1203, the Scan Center Meta Data Processor task requests a mini server to send a list of rolls. When the system will allow, the central server runs the request. At step 1205, upon request, the target mini server returns the list of its new available rolls (in the RAID). This list is packaged in the XML format.

For each roll in the list, the following sub-tasks are en-queued by the Roll claim Host, and the name of the macro-task is the Scan Center Roll claim Processor. At step 1207, the Task Scheduler checks the database for the number of connections between that mini server and the central server(s) that are open (and therefore busy processing). If the number of connections is five or less, this sequence of sub-tasks continues. At step 1209, the Roll claim Host checks the database for the corresponding HTTP Internet address, or Uniform Resource Locator (URL), for that roll of film. At step 1211, the Roll claim Host makes a request to pre-fetch that roll from the mini server. At step 1213, the mini server transforms that roll of full-size images (from its RAID) to photo display size, and sends them to the requesting central server in a Tape Archive (TAR) format. At step 1215, the Roll claim Host writes the roll of images in the central server's repository (for a 24-image roll, this is about one megabyte). At step 1217, the Roll claim Host updates the roll_t table in the central server's database. At step 1219, the central server verifies storing the roll of images and updating the database accordingly. At step 1221, if the verification succeeds, the central server sends an acknowledgement, of receiving that roll, to the mini server that sent it. If any of these sub-tasks queued by the Roll claim Host and the Scan Center Roll claim Processor fail, all of the processing for this roll is re-en-queued with a state set to PENDING. At step 1223, the mini server, upon receipt of the central server's acknowledgement, responds by acknowledging receiving the acknowledgement. If this response by the mini server fails, then only this re-acknowledgement task is re-en-queued, and does not require that the transmission of the received roll to be re-processed. Although re-en-queuing a sub-task violates the all-or-nothing fail-over scheme for master tasks, certain sub-tasks merely perform an acknowledgement. Therefore, the currently-preferred embodiment enables the ability to re-do the acknowledgement even when a scan center is down. The acknowledgement sub-task is used by all the tasks so that if they complete all of their work, the same ability to acknowledge would occur in the unlikely event that the mini server went down just before the acknowledgement, yet after all the real (networking) work was completed.

3. Central Service Cropping

Whenever a user decides to enhance an image (e.g., crop and enlarge the cropped image for e-commerce printing) the central server performs this piece of the service. Although the user is only viewing/manipulating a photo display size resolution of his or her picture throughout this enhancement experience (as shown previously at 110 and 120 in FIG. 1), the central server has a local copy of the corresponding full-size on hand (as shown previously at 130 in FIG. 1). Therefore the photo web server requests the central server to manipulate its copy of the full-size image on-demand.

Figure 13:
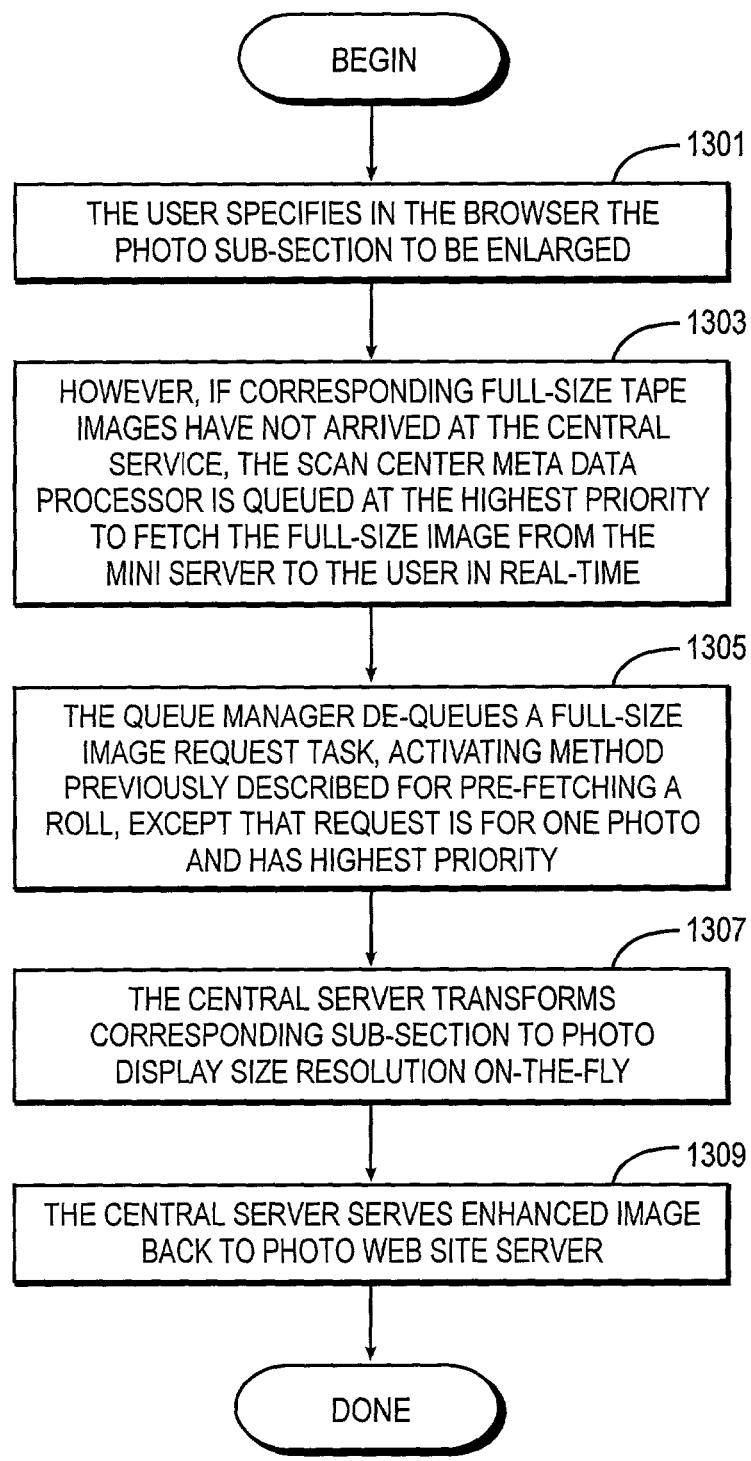
FIG. 13 is a flowchart illustrating the methodology of performing the cropping enhancement at the central service on-demand in a preferred embodiment of the present invention.

FIG. 13 is a flowchart illustrating the methodology of the preferred embodiment performing the cropping enhancement at the central service on-demand. At step 1301, the user specifies, in the browser, the sub-section of the photo to be enlarged. However, if the corresponding full-size images on the tape have not yet arrived at the central service, at step 1303, the Scan Center Meta Data Processor is queued at the highest possible priority to fetch the individual full-size image from the mini server as a real-time response to the user. At step 1305, the Queue Manager de-queues a full-size image request task, activating the method previously described in FIGS. 12A–B for pre-fetching a roll, except that the request is for a single photograph and has the highest priority. At step 1307, the central server transforms the corresponding sub-section to a photo display size resolution on-the-fly (as shown previously at 140 in FIG. 1). At step 1309, the central server serves the enhanced image back to the photo web site server (as shown previously at 150 in FIG. 1). The horsepower of the photo web site server and the low bandwidth between the web server and the user are sufficient to render a photo display size equivalent of the cropped area in the user's browser very quickly. (The claim server in the right column in FIG. 1 is the central server in the preferred embodiment).

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. A method for providing improved online access to digital images, the method comprising:

creating digital images for a particular user, wherein said digital images for a particular user are created from a roll of developed film; assigning a claim number corresponding to the roll of developed film; transferring copies of the digital images to a central server by:

transferring lower-resolution copies of the digital images to the central server using relatively-low bandwidth communication, and subsequently transferring higher-resolution copies of the digital images to the central server using relatively-high bandwidth communication;

requiring the user to input the claim number when requesting access to the digital images;

in response to a user request for online access to the digital images from a browser, transferring said lower-resolution copies to the browser for online viewing; and in response to a user request for an operation that requires a high-resolution copy of a particular one of the digital images, transferring the higher-resolution copy of that particular digital image to the browser.

2. A method for providing improved online access to digital images, the method comprising:

creating digital images for a particular user, wherein said digital images are upon creation initially stored at a mini server that is in communication with a central server;

transferring copies of the digital images to the central server by:

transferring lower-resolution copies of the digital images to the central server using relatively-low bandwidth communication, and receiving a request at the mini server to transfer the higher-resolution copy of a particular one of the digital images to the central server; and transferring the higher-resolution copy to the central server using the relatively-low bandwidth communication;

in response to a user request for online access to the digital images from a browser, transferring said lower-resolution copies to the browser for online viewing; and in response to a user request for an operation that requires a high-resolution copy of a particular one of the digital images, transferring the higher-resolution copy of that particular digital image on the browser.

3. The method of claim 2, wherein said digitizing includes scanning photographic negatives.

4. The method of claim 1, wherein said digital images are created at full resolution.

5. The method of claim 1, further comprising:

transferring said lower-resolution copies of the digital images from the central server to a Web site for supporting online display of the digital images on-demand.

6. The method of claim 5, further comprising:

transforming at least some of the lower-resolution copies of the digital images into thumbnail images at the Web site, for display in the user's browser in response a user request.

7. The method of claim 1, wherein said lower-resolution copies of the digital images comprise photo display size images.

8. The method of claim 1, wherein said higher-resolution copies of the digital images comprise full-size images.

9. The method of claim 1, wherein said operation that requires a high-resolution copy of a particular one of the digital images includes:

online manipulation of the particular digital image.

10. The method of claim 9, wherein said online manipulation of the particular digital image includes cropping.

11. The method of claim 9, wherein said online manipulation of the particular digital image includes enlarging.

12. The method of claim 1, wherein said operation that requires a high-resolution copy of a particular one of the digital images includes:

displaying the particular digital image at full resolution.

13. The method of claim 1, wherein said step of transferring lower-resolution copies occurs via the Internet.

14. The method of claim 13, wherein said step of transferring via the Internet occurs via HTTP communication protocol.

15. The method of claim 1, wherein said digital images are created at one of a plurality of scan centers that are in communication with the central server.

16. The method of claim 1, wherein said step of transferring higher-resolution copies of the digital images includes:
creating a tape archive of the higher-resolution copies; and
transferring information from said tape archive to the central server.

17. The method of claim 16, wherein said tape archive comprises a DLT tape archive.

18. The method of claim 16, wherein said step of transferring information from said tape archive comprises physically transporting the tape archive to the central server.

19. The method of claim 1, wherein the digital images are grouped together in a set identified by the assigned claim number.

20. The method of claim 1, wherein said user request for online access to the digital images from a browser is first received at a Web site, and wherein said step of transferring said lower-resolution copies to the browser for online viewing includes:
transferring said lower-resolution copies from the central server to the Web site; and thereafter
transferring said lower-resolution copies from said Web site to the browser.

21. The method of claim 1, wherein said step of transferring higher-resolution copies of the digital images includes:
transferring higher-resolution copies of the digital images using a high-speed data network.

22. The method of claim 1, wherein said central server is supported by a multi-threaded operating system, and wherein said step of transferring the higher-resolution copy of that particular digital image to the browser occurs as a high-priority thread of the central server.

23. The method of claim 1, wherein said digital images are, upon creation, initially stored at a mini server that is in communication with the central server.

24. The method of claim 23, further comprising:
receiving a request at the mini server to transfer the higher-resolution copy of a particular one of the digital images to the central server; and
transferring the higher-resolution copy to the central server using the relatively-low bandwidth communication.

25. The method of claim 24, wherein said step of transferring the higher-resolution copy to the central server using the relatively-low bandwidth communication occurs as a highest-priority task for the mini server.

26. The method of claim 24, wherein said step of transferring the higher-resolution copy to the central server using the relatively-low bandwidth communication occurs as a highest-priority task for the mini server.

27. The method of claim 1, wherein said central server comprises a centralized set of one or more server computers providing on-demand retrieval of a particular set of digital images that are identified by a claim ID.

28. The method of claim 27, wherein said claim ID comprises a multi-digit identifier for a roll of photographic film that has been developed and scanned.

29. The method of claim 28, wherein said roll of photographic film is scanned at a scan center, and wherein said claim ID is generated at the scan center.

30. The method of claim 29, wherein developed roll of photographic film is labeled with said claim ID, so that the claim ID can be used for online access to the digital images that have been created.

31. The method of claim 1, wherein digital images are created at a scan center, and wherein copies of the digital images created at the scan center are deleted once other copies have been successfully transferred to the central server.

32. The method of claim 1, wherein said central server comprises multiple server computers, and wherein a locking semaphore is used to coordinate tasks among the multiple server computers.

33. The method of claim 1, wherein said digital images are created by scanning a developed roll of film to a local disk present at a scan center.

34. The method of claim 33, wherein said step of transferring higher-resolution copies of the digital images to the central server includes:
copying full-size high-resolution digital images onto a DLT tape present at the scan center.

35. The method of claim 34, wherein the digital images are maintained at the scan center until the full-size images copied onto the DLT tape are successfully transferred to the central server.

36. The system of claim 1, wherein each of said digital images is created by scanning a photograph at full resolution for creating a full-size digital image for the photograph being scanned.

37. A system providing online access to digital images comprising:
a plurality of scan centers for creating digital images by scanning developed photographic film;
a central server serving as a central repository for digital images;
a transport mechanism for transferring both full-resolution copies and lower-resolution copies of the digital images from said scan centers to the central server, the mechanism including:
a high-volume transport mechanism for transferring full-resolution copies of the digital images to the central server, and
a low-volume transport mechanism for transferring lower-resolution copies of the digital images to the central server;
wherein said low-volume transport mechanism operates to transfer said lower-resolution copies to the central server shortly after those copies become available; and
wherein said high-volume transport mechanism operates to transfer said higher-resolution copies to the central server at a point in time after the lower-resolution copies have already been transferred.

38. The system of claim 37, wherein said scanning includes scanning photographic negatives.

39. The system of claim 37, further comprising:
a photo Web site capable of on-demand servicing of user requests to view said lower-resolution copies of the digital images.

40. The system of claim 39, wherein the photo Web site communicates with the central server for on-demand retrieval of said lower-resolution copies of the digital images.

41. The system of claim 40, further comprising:
transforming at least some of the lower-resolution copies of the digital images into thumbnail images at the Web site, for display in a user's browser upon request.

42. The system of claim 37, wherein said lower-resolution copies of the digital images comprise photo display size images.

43. The system of claim 37, wherein said full-resolution copies of the digital images comprise full-size images.

44. The system of claim 37, further comprising:
a browser capable of requesting online manipulation of a particular digital image, that requires a high-resolution copy of a particular one of the digital images to be transfer from the central server to the browser.

45. The system of claim 44, wherein said online manipulation of the particular digital image includes cropping.

46. The system of claim 44, wherein said online manipulation of the particular digital image includes enlarging.

47. The system of claim 46, wherein said transferring via the Internet employs HTTP communication protocol.

48. The system of claim 37, wherein said plurality of scan centers maintain Internet connectivity with the central server.

49. The system of claim 37, wherein said high-volume transport mechanism includes:
an archive device present at one or more of the scan centers for storing full-resolution copies in an archive medium; and
an archive device connected to the central server, for allowing the full-resolution copies to be transferred to the central server.

50. The system of claim 49, wherein both archive devices comprise tape archive devices.

51. The system of claim 50, wherein said archive medium comprises a DLT tape.

52. The system of claim 37, wherein a unique identifier is assigned to each roll of developed film that is scanned, for allowing the corresponding digital images to be accessed online using the unique identifier.

53. The system of claim 37, wherein said low-volume transport mechanism comprises transferring via the Internet.

54. A method for providing improved online access to digital images, the method comprising:
creating digital images for a particular user, wherein said digital images are upon creation initially stored at a mini server that is in communication with a central server;
transferring copies of the digital images to the central server by:
transferring lower-resolution copies of the digital images to the central server using relatively-low bandwidth communication, and
receiving a request at the mini server to transfer the higher-resolution copy of a particular one of the digital images to the central server; and
transferring the higher-resolution copy to the central server using the relatively-low bandwidth communication;
in response to a user request for online access to the digital images from a browser, transferring said lower-resolution copies to the browser for online viewing; and
in response to a user request for an operation that requires a high-resolution copy of a particular one of the digital images, transferring the higher-resolution copy of that particular digital image to the browser.

* * * * *